US012567795B2

(12) United States Patent
Okuzono et al.

(10) Patent No.: US 12,567,795 B2
(45) Date of Patent: Mar. 3, 2026

(54) NOISE REDUCTION CIRCUITRY, LOAD SYSTEM AND POWER CONVERSION DEVICE

(71) Applicant: DAIKIN INDUSTRIES, LTD., Osaka (JP)

(72) Inventors: Kodai Okuzono, Osaka (JP); Yoshitsugu Koyama, Osaka (JP); Masaki Kono, Osaka (JP); Hirotaka Doi, Osaka (JP); Reiji Kawashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 203 days.

(21) Appl. No.: 18/590,494

(22) Filed: Feb. 28, 2024

(65) Prior Publication Data

US 2024/0204651 A1     Jun. 20, 2024

Related U.S. Application Data

(63) Continuation of application No. PCT/JP2022/036786, filed on Sep. 30, 2022.

(30) Foreign Application Priority Data

Sep. 30, 2021    (JP) ................................. 2021-162111

(51) Int. Cl.
    *H02M 1/12*       (2006.01)
    *H02M 1/00*       (2006.01)
    *H02M 7/5387*     (2007.01)
(52) U.S. Cl.
    CPC ......... *H02M 1/126* (2013.01); *H02M 1/0009* (2021.05); *H02M 7/53871* (2013.01)
(58) Field of Classification Search
    CPC . H02M 1/126; H02M 1/0009; H02M 7/53871
    See application file for complete search history.

(56) References Cited

U.S. PATENT DOCUMENTS

| | | | |
|---|---|---|---|
| 10,177,702 B2 * | 1/2019 | Shimura | ................. H02M 1/44 |
| 11,088,614 B2 * | 8/2021 | Osako | ..................... H02M 1/44 |

(Continued)

FOREIGN PATENT DOCUMENTS

| | | |
|---|---|---|
| JP | 3044650 B2 | 5/2000 |
| JP | 2002-252985 A | 9/2002 |

(Continued)

OTHER PUBLICATIONS

International Search Report for PCT/JP2022/036786 (PCT/ISA/210) mailed on Nov. 22, 2022.

(Continued)

*Primary Examiner* — Adolf D Berhane
(74) *Attorney, Agent, or Firm* — Birch, Stewart, Kolasch & Birch, LLP

(57)     ABSTRACT

[Problem] To suppress the disadvantage that occurs with regard to the flow of a compensation current when a voltage of a power source of a noise canceller is lower than a DC link voltage of a power converter.
[Solving means] A noise reduction circuitry includes a noise canceller that injects a compensation current into a power line or an earth to reduce a common mode noise current flowing to an alternating-current power source from a power converter including a switching element connected to the alternating-current power source through the power line and the earth, and a direct-current power source that supplies power to the noise canceller, and a voltage Vcc of the direct-current power source is less than ⅔ of a peak value of a DC link voltage of the power converter, and when a connection point between the power line and a path connecting the power line and the earth via the noise canceller is a first connection point, and a connection point between the path and the earth is a second connection point, when the compensated common mode noise current whose positive direction is a direction of flow from the alternating-current power source side to the first connection point and flowing through the power line on a side closer to the alternating-current power source than the first connection point is Ig(t), (Continued)

when the compensation current whose positive direction is a direction of flow from the alternating-current power source side to the first connection point and flowing through the path is Io(t), when an impedance of the path is Z1, when an impedance on a side closer to the alternating-current power source than the first connection point and the second connection point is Z2, and when $V(t)=2*(Z1*Io(t)-Z2*Ig(t))$, the voltage Vcc is set to be a maximum value of a quasi-peak value of V(t) or $\sqrt{2}$ times or more an effective value of V(t).

13 Claims, 16 Drawing Sheets

(56) References Cited

U.S. PATENT DOCUMENTS

| | | | |
|---|---|---|---|
| 12,438,440 B2 * | 10/2025 | Okuzono | ................ H02M 5/42 |
| 2002/0075702 A1 | 6/2002 | Igarashi et al. | |
| 2004/0008527 A1 | 1/2004 | Honda | |
| 2013/0147419 A1 | 6/2013 | Sakai et al. | |
| 2017/0047881 A1 | 2/2017 | Shimura et al. | |
| 2024/0356432 A1 * | 10/2024 | Koyama | ................ H02M 7/48 |

FOREIGN PATENT DOCUMENTS

| | | | |
|---|---|---|---|
| JP | 2004-534500 A | 11/2004 | |
| JP | 2006-333647 A | 12/2006 | |
| JP | 2009-77533 A | 4/2009 | |
| JP | 2017-38500 A | 2/2017 | |
| WO | WO 03/005578 A1 | 1/2003 | |

OTHER PUBLICATIONS

Extended European Search Report for European Application No. 22876558.2, dated Jan. 7, 2025.

* cited by examiner

NOISE REDUCTION CIRCUITRY, LOAD SYSTEM AND POWER CONVERSION DEVICE

CROSS REFERENCE TO RELATED APPLICATIONS

This application is a Continuation of PCT International Application No. PCT/JP2022/036786 filed on Sep. 30, 2022, which claims priority under 35 U.S.C. § 119(a) to Patent Application No. 2021-162111 filed in Japan on Sep. 30, 2021, all of which are hereby expressly incorporated by reference into the present application.

TECHNICAL FIELD

The present disclosure relates to a noise reduction circuitry, a load system and a power conversion device.

BACKGROUND ART

PTL 1 describes a noise reduction device for a power conversion device in which an electric motor is connected as a load to an inverter device including an alternating-current power source, a rectifier circuitry, a smoothing capacitor, and an inverter circuitry, a leakage current detector is connected between the alternating-current power source and the rectifier circuitry, an NPN-type first transistor is connected between one end of the smoothing capacitor and a case of the electric motor, and a PNP-type second transistor is connected between the case of the electric motor and the other end of the smoothing capacitor, and the first and second transistors are driven by an output of the leakage current detector to inject the current for canceling common mode noise.

CITATION LIST

Patent Literature

PTL 1: Patent No. 3044650

SUMMARY OF INVENTION

Technical Problem

When the voltage of the power source of the noise canceller is lower than the DC link voltage of the power converter, an element having a low voltage resistance may be used in the noise canceller. However, when the voltage of the power source of the noise canceller is lower than the DC link voltage of the power converter, a disadvantage may occur with regard to the flow of a compensation current.

An object of the present disclosure is to suppress a disadvantage that occurs with regard to the flow of a compensation current when the voltage of the power source of the noise canceller is lower than the DC link voltage of the power converter.

Solution to Problem

A noise reduction circuitry according to a first aspect of the present disclosure is a noise reduction circuitry including a noise canceller that injects a compensation current into a power line or an earth to reduce a common mode noise current flowing to an alternating-current power source from a power converter including a switching element connected to the alternating-current power source through the power line and the earth, and a direct-current power source that supplies power to the noise canceller, and a voltage Vcc of the direct-current power source is less than ⅔ of a peak value of a DC link voltage of the power converter, and when a connection point between the power line and a path connecting the power line and the earth via the noise canceller is a first connection point, and a connection point between the path and the earth is a second connection point, when the compensated common mode noise current whose positive direction is a direction of flow from the alternating-current power source side to the first connection point and flowing through the power line on a side closer to the alternating-current power source than the first connection point is Ig(t), when the compensation current whose positive direction is a direction of flow from the second connection point to the first connection point and flowing through the path is Io(t), when an impedance of the path is Z1, when an impedance on a side closer to the alternating-current power source than the first connection point and the second connection point is Z2, and when $V(t)=2*(Z1*Io(t)-Z2*Ig(t))$, the voltage Vcc is set to be a maximum value of a quasi-peak value of the V(t) or √2 times or more an effective value of the V(t).

With this noise reduction circuitry, it is possible to suppress the disadvantage that the compensation current does not sufficiently flow when the voltage of the power source of the noise canceller is lower than the DC link voltage of the power converter.

With a noise reduction circuitry according to a second aspect of the present disclosure, in the noise reduction circuitry according to the first aspect of the present disclosure, the voltage Vcc may be set to be equal to or more than a maximum value of an absolute value of the V(t).

Thus, it is possible to more reliably suppress the disadvantage that the compensation current does not sufficiently flow when the voltage of the power source of the noise canceller is lower than the DC link voltage of the power converter.

A noise reduction circuitry according to a third aspect of the present disclosure, in the noise reduction circuitry according to the first or second aspect of the present disclosure, may include a noise detection unit that detects common mode noise generated in the power line on a side closer to the alternating-current power source than the first connection point, and the noise detection unit may use a variation in a voltage with respect to the earth to detect a common mode noise voltage.

Thus, it is possible to suppress an increase in the impedance due to the noise detection unit.

A noise reduction circuitry according to a fourth aspect of the present disclosure, in the noise reduction circuitry according to the first or second aspect of the present disclosure, may include a noise detection unit that detects common mode noise generated in the power line on a side closer to the alternating-current power source than the first connection point, and the noise detection unit may detect the common mode noise current flowing through the power line.

Thus, the common mode noise may be compensated for by amplifying the detected common mode noise current as it is.

With a noise reduction circuitry according to a fifth aspect of the present disclosure, in the noise reduction circuitry according to the first or second aspect of the present disclosure, the voltage Vcc may be 250 V or less.

Thus, it is possible to reduce the voltage resistance of the components constituting the noise canceller.

With a noise reduction circuitry according to a sixth aspect of the present disclosure, in the noise reduction circuitry according to the first or second aspect of the present disclosure, the voltage Vcc may be 100 V or less.

Thus, it is possible to use a high-speed transistor with a low voltage resistance in the noise canceller.

With a noise reduction circuitry according to a seventh aspect of the present disclosure, in the noise reduction circuitry according to the first or second aspect of the present disclosure, the voltage Vcc may be 30 V or less.

Thus, a high-speed operational amplifier may be used in the noise canceller.

With a noise reduction circuitry according to an eighth aspect of the present disclosure, in the noise reduction circuitry according to any one of the first to seventh aspects of the present disclosure, the power converter may include a rectifying unit that rectifies an alternating-current voltage from the alternating-current power source to generate the DC link voltage, at one of the first connection point and the second connection point of the path, one of the power line on a side closer to the alternating-current power source than the rectifying unit and the earth may be connected to the direct-current power source via a coupling capacitor, and at the other of the first connection point and the second connection point of the path, the other of the power line and the earth may be connected to an output unit that outputs a compensation current of the noise canceller via an output capacitor.

Thus, it is possible to reduce the impedance in a high-frequency range.

With a noise reduction circuitry according to a ninth aspect of the present disclosure, in the noise reduction circuitry according to any one of the first to seventh aspects of the present disclosure, the V(t) may obtain the Ig(t)=0.

Thus, it is possible to easily calculate the necessary power source voltage.

A load system according to a first aspect of the present disclosure is a load system including the noise reduction circuitry according to any one of the first to seventh aspects of the present disclosure, and the compensated common mode noise current Ig(t) is a noise current measured when the power converter operates under a predetermined load condition of the load system in a state where a pseudo power source circuitry network that measures common mode noise of the load system is connected between the alternating-current power source and the load system, and the Z2 is an impedance including the pseudo power source circuitry network.

With this load system, when there is a standard of a noise level to be maintained at the time of measurement using the pseudo power source circuitry network, it is possible to determine a voltage range necessary for suppressing the noise level to be equal to or less than the standard.

With a load system according to a second aspect of the present disclosure, in the load system according to the first aspect of the present disclosure, the load system may be an air conditioner including an indoor unit and an outdoor unit capable of performing at least one of a cooling operation and a heating operation, and the predetermined load condition may be that, in a case of the cooling operation, a suction temperature of the indoor unit is 25 to 35 degrees and a set temperature of the indoor unit is a settable lowest temperature, and in a case of the heating operation, a suction temperature of the indoor unit is 10 to 20 degrees and a set temperature of the indoor unit is a settable highest temperature.

Thus, it is possible to determine the voltage range necessary for suppressing the noise level to be equal to or less than the standard under the load condition defined by the standard in the air conditioner.

A noise reduction circuitry according to a tenth aspect of the present disclosure is a noise reduction circuitry including a noise canceller that injects a compensation current into a power line or an earth to reduce a common mode noise current flowing to an alternating-current power source from a power converter including a switching element connected to the alternating-current power source through the power line and the earth, and a direct-current power source that supplies power to the noise canceller, and a voltage Vcc of the direct-current power source is less than ⅔ of a peak value of a DC link voltage of the power converter, and when a connection point between the power line and a path connecting the power line and the earth via the noise canceller is a first connection point, and a connection point between the path and the earth is a second connection point, when the compensated common mode noise current whose positive direction is a direction of flow from the first connection point to the power converter side and flowing through the power line on a side closer to the power converter than the first connection point is Ic'(t), when the compensation current whose positive direction is a direction of flow from the second connection point to the first connection point and flowing through the path is Io(t), when an impedance of the path is Z1, when an impedance on a side closer to the power converter than the first connection point and the second connection point is Z3, and when V(t)=2*(Z1*Io(t)+Z3*Ic'(t)), the voltage Vcc is set to be a maximum value of a quasi-peak value of the V(t) or √2 times or more an effective value of the V(t).

With this noise reduction circuitry, it is possible to suppress the disadvantage that the compensation current does not sufficiently flow when the voltage of the power source of the noise canceller is lower than the DC link voltage of the power converter.

A noise reduction circuitry according to an eleventh aspect of the present disclosure, in the noise reduction circuitry according to the tenth aspect of the present disclosure, may include a noise detection unit that detects common mode noise generated in the power line on a side closer to the power converter than the first connection point, and the noise detection unit may detect the compensated common mode noise current Ic'(t) flowing through the power line.

Thus, the common mode noise may be compensated for by amplifying the detected common mode noise current as it is.

A power conversion device according to a first aspect of the present disclosure is a power conversion device including a noise canceller that injects a compensation current into a power line or an earth to reduce a common mode noise current flowing to an alternating-current power source from a power converter including a switching element connected to the alternating-current power source through the power line and the earth, and a direct-current power source that supplies power to the noise canceller, and the direct-current power source is connected to the power line via a coupling capacitor on a side closer to the alternating-current power source than the power converter, a voltage Vcc of the direct-current power source is less than ⅔ of a peak value of a DC link voltage of the power converter, a noise filter including a common mode choke coil or a Y capacitor is provided between the alternating-current power source and the power converter, and the noise detection unit and the coupling capacitor are connected to the power line on a side closer to the alternating-current power source than the noise filter.

With this power conversion device, it is possible to suppress the disadvantage that, when the voltage of the power source of the noise canceller is lower than the DC link voltage of the power converter, the compensation current flows to the power converter side and the compensation effect is reduced.

A power conversion device according to a second aspect of the present disclosure, in the power conversion device according to the first aspect of the present disclosure, may include a noise detection unit that detects the common mode noise current flowing through the power line.

Thus, the common mode noise may be compensated for by amplifying the detected common mode noise current as it is.

With a power conversion device according to a third aspect of the present disclosure, in the power conversion device according to the second aspect of the present disclosure, an impedance of the noise detection unit with respect to the common mode noise current may be lower than an impedance of the common mode choke coil of the noise filter with respect to the common mode noise current.

Thus, it is possible to reduce the impedance of the compensation current path.

With a power conversion device according to a fourth aspect of the present disclosure, in the power conversion device according to the second aspect of the present disclosure, an impedance of the noise detection unit with respect to the common mode noise current may be $1/10$ or less of an impedance of the common mode choke coil of the noise filter with respect to the common mode noise current.

Thus, the impedance of the compensation current path may be further reduced.

With a power conversion device according to a fifth aspect of the present disclosure, in the power conversion device according to the second aspect of the present disclosure, an impedance of the noise detection unit with respect to the common mode noise current may be $1/100$ or less of an impedance of the common mode choke coil of the noise filter with respect to the common mode noise current.

Thus, the impedance of the compensation current path may be further reduced.

With a power conversion device according to a sixth aspect of the present disclosure, in the power conversion device according to the first aspect of the present disclosure, a voltage of the direct-current power source may be 250 V or less.

Thus, it is possible to reduce the voltage resistance of the components constituting the noise canceller.

With a power conversion device according to a seventh aspect of the present disclosure, in the power conversion device according to the first aspect of the present disclosure, a voltage of the direct-current power source may be 100 V or less.

Thus, it is possible to use a high-speed transistor with a low voltage resistance in the noise canceller.

With a power conversion device according to an eighth aspect of the present disclosure, in the power conversion device according to the first aspect of the present disclosure, a voltage of the direct-current power source may be 30 V or less.

Thus, a high-speed operational amplifier may be used in the noise canceller.

A refrigeration apparatus according to the present disclosure is a refrigeration apparatus including the noise reduction circuitry according to any one of the first to eleventh aspects of the present disclosure or the power conversion device according to any one of the first to eighth aspects of the present disclosure.

With this refrigeration apparatus, it is possible to suppress the disadvantage that occurs with regard to the flow of the compensation current when the voltage of the power source of the noise canceller is lower than the DC link voltage of the power converter.

DESCRIPTION OF EMBODIMENTS

Embodiments will be described below in detail with reference to the accompanying drawings.

First Embodiment

Figure 1:
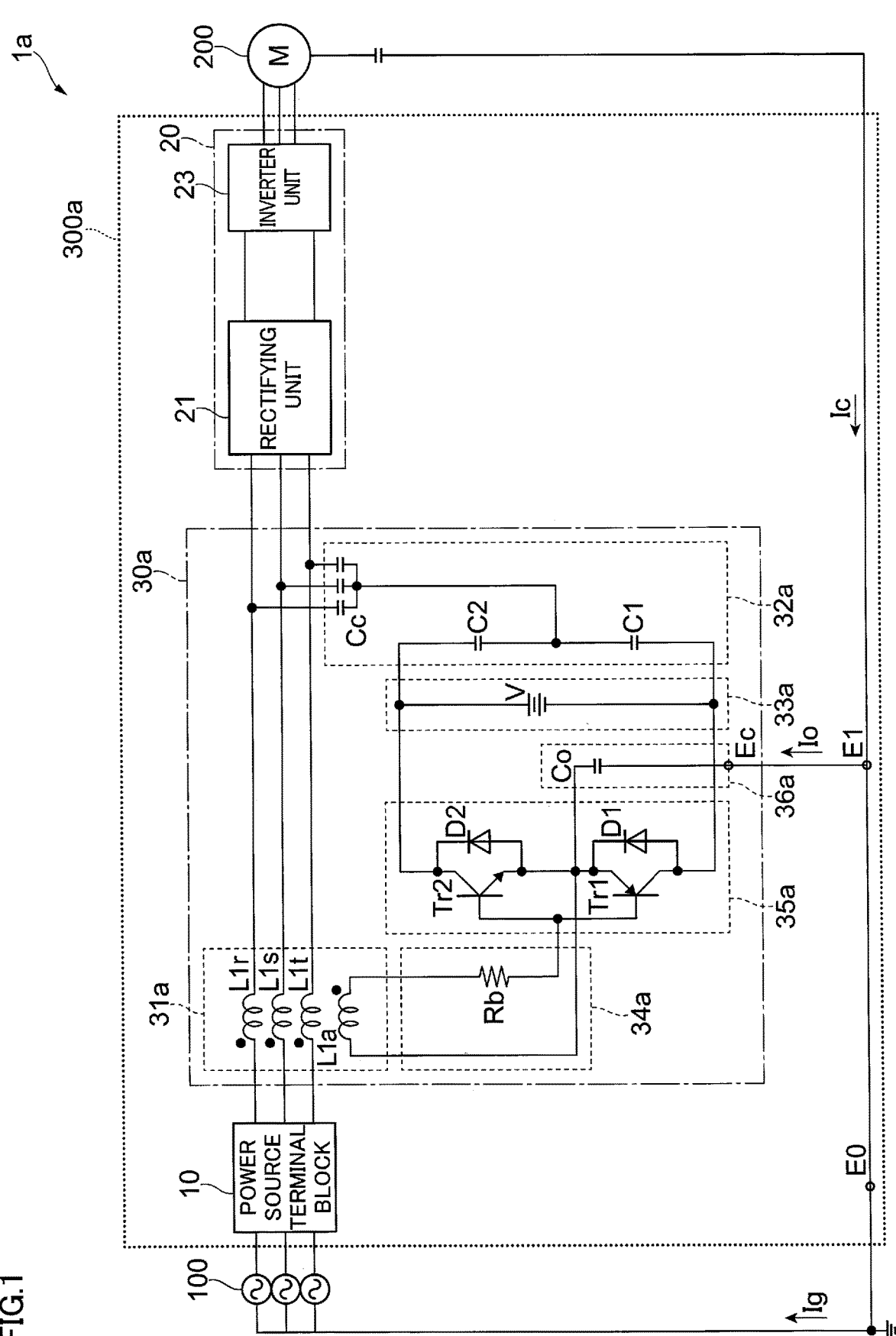
FIG. 1 is a diagram illustrating a circuitry configuration of a power conversion system according to a first embodiment.

FIG. 1 is a diagram illustrating a circuitry configuration of a power conversion system 1a according to a first embodiment. As illustrated in the drawing, the power conversion system 1a includes an alternating-current power source 100, a motor 200, and a power conversion device 300a.

The alternating-current power source 100 is, for example, a three-phase three-wire commercial alternating-current power source and supplies an alternating current to the power conversion device 300a. Here, a first phase to a third phase are referred to as an R phase, an S phase, and a T phase. Furthermore, the power lines that supply the R phase, the S phase, and the T phase are referred to as R-phase, S-phase, and T-phase power lines. When the phases are not distinguished from each other, they are referred to as power lines. Although the case of using the three-phase three-wire alternating current will be described below, the same idea is appliable for the configuration even in the case of using a three-phase four-wire alternating current or a single-phase alternating current.

The motor 200 is a motor that is connected to the power conversion device 300a and is controlled with a three-phase alternating current as a load. The motor 200 may be, for example, a DC brushless motor. Alternatively, the motor 200 may be other three-phase alternating-current motors.

The power conversion device 300a includes a power source terminal block 10, a power converter 20, and a noise reduction circuitry 30a.

The power source terminal block 10 is a portion to which a wire is connected to input an alternating current from the alternating-current power source 100. The power source terminal block 10 includes an R-phase input terminal, an S-phase input terminal, and a T-phase input terminal that are not illustrated. Further, although illustrated in a position away from the power source terminal block 10 in the drawing, the power source terminal block 10 may also include an earth terminal E0 to which an external earth wire is connected.

The power converter 20 includes a rectifying unit 21 and an inverter unit 23. In the power converter 20, the rectifying unit 21 and the inverter unit 23 are connected in this order from the alternating-current power source 100 side. Further, the inverter unit 23 is connected to the motor 200.

The rectifying unit 21 rectifies the alternating current supplied from the alternating-current power source 100 into a direct current. The inverter unit 23 converts the direct current output from the rectifying unit 21 into a three-phase alternating current and supplies it to the motor 200. Although not illustrated, the inverter unit 23 includes a switching element. For example, an insulated gate bipolar transistor (IGBT (Insulated Gate Bipolar Transistor)) may be used as the switching element. Further, a smoothing unit may be provided between the rectifying unit 21 and the inverter unit 23 to smooth the direct current output from the rectifying unit 21. In order to reduce a noise current that is caused by a switching operation of the switching element of the inverter unit 23 and flows into the alternating-current power source 100, an LC circuitry may be provided, which includes a reactor and a capacitor having a capacitance that may hardly smooth the direct-current voltage output from the rectifying unit 21 but may suppress a ripple voltage caused by the switching operation, between the rectifying unit 21 and the inverter unit 23.

The noise reduction circuitry 30a is an active common mode noise reduction circuitry that detects, feeds back, and suppresses common mode noise. The noise reduction circuitry 30a includes a noise detection unit 31a, a coupling capacitor unit 32a, a direct-current power source unit 33a, a detection circuitry 34a, an amplifier 35a, and an output capacitor unit 36a.

The noise detection unit 31a detects a common mode noise current. An example of the noise detection unit 31a is a detection core. The detection core may include a conductive wire to be passed through a toroidal core, but the one including coils (windings) L1r, L1s, L1t, L1a will be described here as an example.

The coils L1r, L1s, L1t are coils connected in series for the R-phase, S-phase, and T-phase power lines, respectively. Here, the coils refer to conductive wires wound in a spiral (loop) manner to constitute an inductor.

The coils L1r, L1s, L1t are conductive wires (wires) constituting a part of the power lines and are configured by being wound around one toroidal core. The toroidal core is formed of, for example, an annular (doughnut-shaped) magnetic material such as ferrite having a circular shape in cross-section. The toroidal core may be referred to as an iron core. Furthermore, the toroidal core does not need to be annular, but may have a polygonal frame shape such as a square shape or a triangular shape. Further, the cross-sectional shape may be a square, a triangle, or the like.

The coils L1r, L1s, L1t are wound around one toroidal core to be adjacent to each other. Therefore, the coils L1r, L1s, L1t are magnetically coupled to each other (magnetic coupling). Further, the coils L1r, L1s, L1t are wound to have the polarities indicated by "." in FIG. 1.

The coil L1a is provided to be magnetically coupled to the coils L1r, L1s, L1t (magnetic coupling). For example, the coil L1a is wound around one toroidal core to be adjacent to the coils L1r, L1s, L1t. Alternatively, the coils L1r, L1s, L1t may be wound around one toroidal core to be adjacent to each other, and the coil L1a may be wound to be overlapped with the coils L1r, L1s, L1t. Further, the coil L1a is wound to have the polarity indicated by "•" in FIG. 1.

The coils L1r, L1s, L1t, L1a are wound such that, when a current flows through the coils L1r, L1s, L1t in, for example, the right direction in the drawing, a current flows through the coil L1a in the left direction in the drawing. Therefore, the above-described polarity indicated by "•" is the polarity according to the direction in which the current flows.

The common mode noise current is a high-frequency current that leaks to the ground via a stray capacitance of the motor 200, or the like, due to switching of a switching element St of the inverter unit 23. Therefore, the common mode noise current flows between the R-phase, S-phase, and T-phase power lines and the ground (earth).

When the common mode noise current flows through the coils L1r, L1s, L1t, the current proportional to the common mode noise current is induced in the coil L1a via the toroidal core. In this case, the coils L1r, L1s, L1t and the coil L1a function as a current transformer and constitute a detection transformer that detects the common mode noise current.

The coupling capacitor unit 32a includes a coupling capacitor Cc and capacitors C1, C2. The capacitors C1, C2 are connected in series and are connected in parallel to the direct-current power source unit 33a and the amplifier 35a. Three terminals on one side of the coupling capacitor Cc are connected to the R-phase, S-phase, and T-phase power lines, respectively. A terminal on the other side of the coupling capacitor Cc is connected to a connection point between the capacitors C1, C2 connected in series. Further, the coupling capacitor unit 32a serves as a path that flows a compensation current between the R-phase, S-phase, and T-phase power lines and the amplifier 35a via the coupling capacitor Cc and the capacitors C1, C2.

The direct-current power source unit 33a includes a direct-current power source V. The direct-current power source V supplies a direct-current voltage to the amplifier 35a. The detection circuitry 34a includes a base resistor Rb. The base resistor Rb is a resistor that limits a base current flowing through the amplifier 35a. Here, the circuitry connected between a connection portion of the detection core and the base resistor Rb is a detection circuitry.

The amplifier 35a includes first and second transistors Tr1, Tr2 as examples of first and second current control elements and first and second diodes D1, D2.

The first transistor Tr1 is connected between one end of the direct-current power source V and the output capacitor unit 36a. The second transistor Tr2 is connected between the other end of the direct-current power source V and the output capacitor unit 36a. The first transistor Tr1 is of a PNP type, the second transistor Tr2 is of an NPN type, and the first and second transistors Tr1, Tr2 have polarities opposite to each other. The bases (control terminals) of the first and second transistors Tr1, Tr2 are connected to an output line on one side of the coil L1a, and an interconnection point between the first and second transistors Tr1, Tr2 is connected to an output line on the other side of the coil L1a. Thus, the first and second transistors Tr1 and Tr2 operate reversely to each other.

The first and second diodes D1, D2 are connected in anti-parallel with the first and second transistors Tr1, Tr2 to protect them. Further, the first and second diodes D1, D2 may not be provided.

Although the amplifier 35a used here includes a transistor, the amplifier 35a may include an operational amplifier instead of a transistor.

The output capacitor unit 36a includes an output capacitor Co. One end of the output capacitor Co is connected to a connection point between the first and second transistors Tr1, Tr2 on the emitter side, and the other end is connected to an earth terminal E1 of the housing via a compensation current path connection terminal Ec. A configuration may be adopted, in which the output capacitor unit 36a is not provided or, in addition to the output capacitor Co, the output capacitor unit 36a includes a resistor directly connected to it. Alternatively, a configuration may be adopted, in which the output capacitor unit 36a is connected to a power line and the direct-current power source unit 33a is connected to the earth directly or via a coupling capacitor.

According to the first embodiment, the detection circuitry 34a, the amplifier 35a, and the output capacitor unit 36a constitute a noise canceller.

An operation of the power conversion system 1a according to the first embodiment will be described here.

The commercial alternating-current power source 100 supplies an alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, a common mode noise current Ic flows from the motor 200 every time a pulsed voltage is applied from the inverter unit 23. The noise detection unit 31a detects the common mode noise current in the power line input to the power converter 20 and drives the first and second transistors Tr1, Tr2. When the current detected by the noise detection unit 31a flows into the bases of the first and second transistors Tr1, Tr2, it is amplified by the first and second transistors Tr1, Tr2.

When the first transistor Tr1 is on (when a positive common mode noise current Ic is generated), a compensation current Io is supplied from the direct-current power source V and flows through a current path (compensation current path) from the plus terminal of the direct-current power source V to the minus terminal of the direct-current power source V via the capacitor C2, the coupling capacitor Cc, the alternating-current power source 100, the output capacitor Co, and the first transistor Tr1. In this case, the common mode noise current Ic, the compensation current Io, and a compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

When the second transistor Tr2 is on (when the negative common mode noise current Ic is generated), the compensation current Io is supplied from the direct-current power source V and flows through a current path (compensation current path) from the plus terminal of the direct-current power source V to the minus terminal of the direct-current power source V via the second transistor Tr2, the output capacitor Co, the alternating-current power source 100, the coupling capacitor Cc, and the capacitor C1. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the first embodiment, the noise detection unit 31a detects the common mode noise current, but the noise detection unit 31a may detect a common mode noise voltage. In that case, the noise reduction circuitry 30a may estimate the common mode noise current flowing through the path from the common mode noise voltage detected by the noise detection unit 31a and cause the compensation current to flow so as to cancel the common mode noise current.

Second Embodiment

Figure 2:
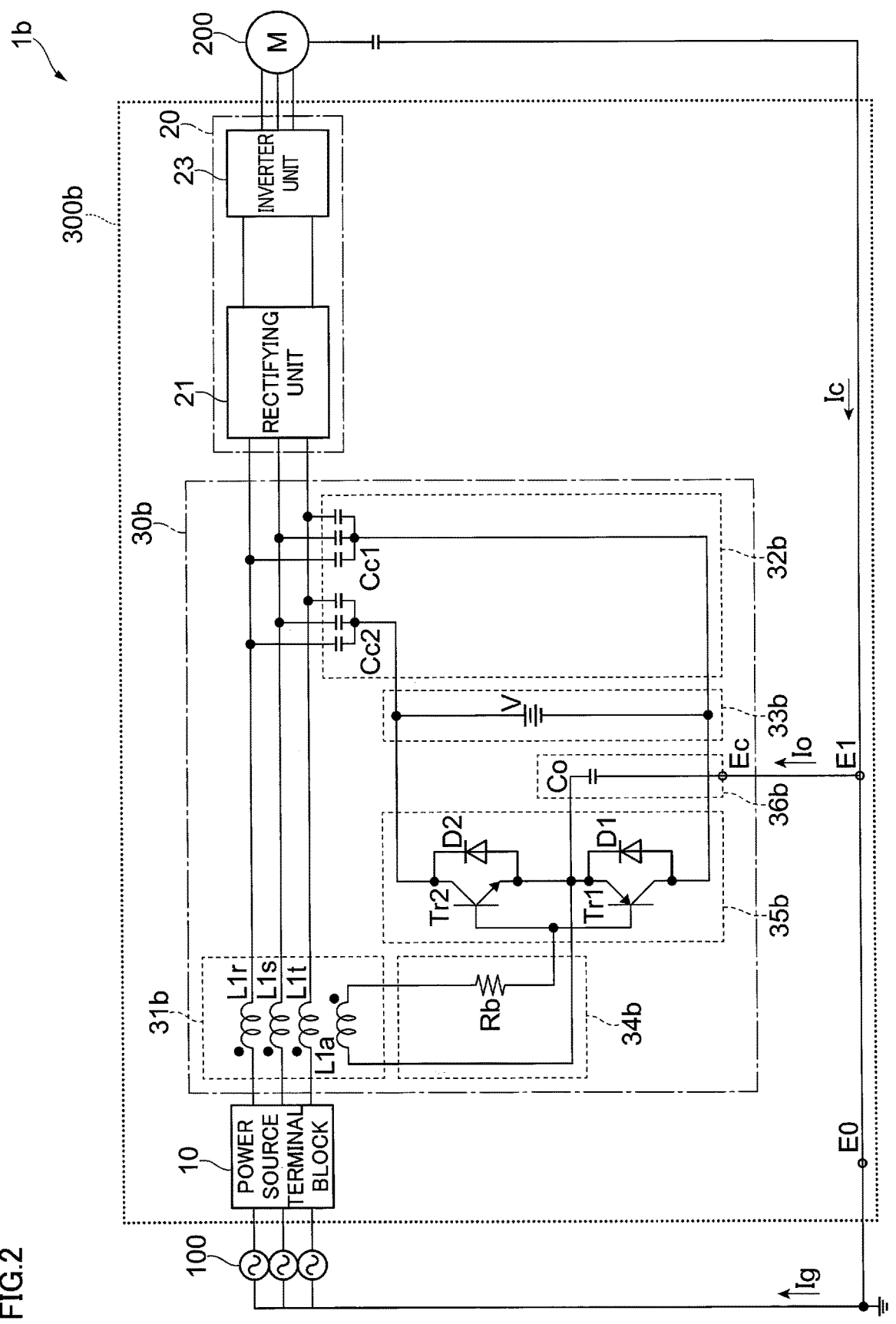
FIG. 2 is a diagram illustrating a circuitry configuration of a power conversion system according to a second embodiment.

FIG. 2 is a diagram illustrating a circuitry configuration of a power conversion system 1b according to a second embodiment. As illustrated in the drawing, the power conversion system 1b includes the alternating-current power source 100, the motor 200, and a power conversion device 300b.

As the alternating-current power source 100 and the motor 200 are the same as those described in the first embodiment, the description thereof will be omitted.

The power conversion device 300b includes the power source terminal block 10, the power converter 20, and a noise reduction circuitry 30b.

As the power source terminal block 10 and the power converter 20 are the same as those described in the first embodiment, the description thereof will be omitted.

The noise reduction circuitry 30b is an active common mode noise reduction circuitry that detects, feeds back, and suppresses common mode noise. The noise reduction circuitry 30b includes a noise detection unit 31b, a coupling capacitor unit 32*b*, a direct-current power source unit 33*b*, a detection circuitry 34*b*, an amplifier 35*b*, and an output capacitor unit 36*b*.

The noise detection unit 31*b*, the direct-current power source unit 33*b*, the detection circuitry 34*b*, the amplifier 35*b*, and the output capacitor unit 36*b* are the same as the noise detection unit 31*a*, the direct-current power source unit 33*a*, the detection circuitry 34*a*, the amplifier 35*a*, and the output capacitor unit 36*a* in the first embodiment, and therefore the description thereof will be omitted.

The coupling capacitor unit 32*b* includes coupling capacitors Cc1, Cc2. Three terminals on one side of the coupling capacitor Cc1 are connected to the R-phase, S-phase, and T-phase power lines, respectively. The terminal on the other side of the coupling capacitor Cc1 is connected to the direct-current power source unit 33*b* and the amplifier 35*b*. Three terminals on one side of the coupling capacitor Cc2 are connected to the R-phase, S-phase, and T-phase power lines, respectively. The terminal on the other side of the coupling capacitor Cc2 is connected to the direct-current power source unit 33*b* and the amplifier 35*b*. Further, the coupling capacitor unit 32*b* serves as a path that flows a compensation current between the R-phase, S-phase, and T-phase power lines and the amplifier 35*b* via the coupling capacitors Cc1, Cc2.

According to the second embodiment, the detection circuitry 34*b*, the amplifier 35*b*, and the output capacitor unit 36*b* constitute a noise canceller.

An operation of the power conversion system 1*b* according to the second embodiment will be described here.

The commercial alternating-current power source 100 supplies an alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, the common mode noise current Ic flows from the motor 200 every time a pulsed voltage is applied from the inverter unit 23. The noise detection unit 31*b* detects a common mode noise current in the power line input to the power converter 20 and drives the first and second transistors Tr1, Tr2. When the current detected by the noise detection unit 31*b* flows into the bases of the first and second transistors Tr1, Tr2, it is amplified by the first and second transistors Tr1, Tr2.

When the first transistor Tr1 is on (when the positive common mode noise current Ic is generated), the compensation current Io is supplied from the direct-current power source V and flows through a current path (compensation current path) from the plus terminal of the direct-current power source V to the minus terminal of the direct-current power source V via the coupling capacitor Cc2, the alternating-current power source 100, the output capacitor Co, and the first transistor Tr1. In this case, the common mode noise current Ic, the compensation current Io, and the compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

When the second transistor Tr2 is on (when the negative common mode noise current Ic is generated), the compensation current Io is supplied from the direct-current power source V and flows through a current path (compensation current path) from the plus terminal of the direct-current power source V to the minus terminal of the direct-current power source V via the second transistor Tr2, the output capacitor Co, the alternating-current power source 100, and the coupling capacitor Cc1. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the second embodiment, the noise detection unit 31*b* detects the common mode noise current, but the noise detection unit 31*b* may detect a common mode noise voltage. In that case, the noise reduction circuitry 30*b* may estimate the common mode noise current flowing through the path from the common mode noise voltage detected by the noise detection unit 31*b* and cause the compensation current to flow so as to cancel the common mode noise current.

Third Embodiment

Figure 3:
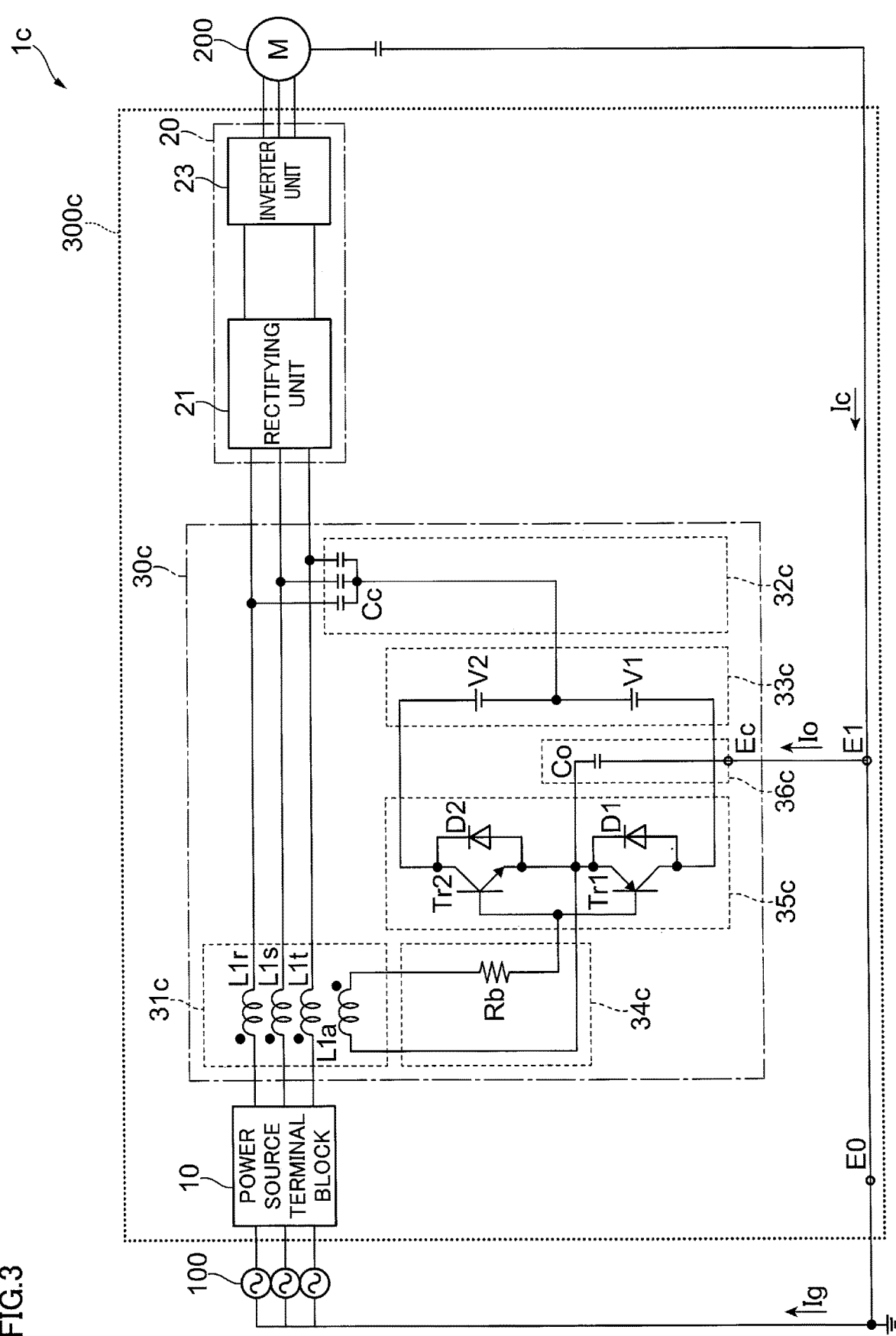
FIG. 3 is a diagram illustrating a circuitry configuration of a power conversion system according to a third embodiment.

FIG. 3 is a diagram illustrating a circuitry configuration of a power conversion system 1*c* according to a third embodiment. As illustrated in the drawing, the power conversion system 1*c* includes the alternating-current power source 100, the motor 200, and a power conversion device 300*c*.

As the alternating-current power source 100 and the motor 200 are the same as those described in the first embodiment, the description thereof will be omitted.

The power conversion device 300*c* includes the power source terminal block 10, the power converter 20, and a noise reduction circuitry 30*c*.

As the power source terminal block 10 and the power converter 20 are the same as those described in the first embodiment, the description thereof will be omitted.

The noise reduction circuitry 30*c* is an active common mode noise reduction circuitry that detects, feeds back, and suppresses common mode noise. The noise reduction circuitry 30*c* includes a noise detection unit 31*c*, a coupling capacitor unit 32*c*, a direct-current power source unit 33*c*, a detection circuitry 34*c*, an amplifier 35*c*, and an output capacitor unit 36*c*.

The noise detection unit 31*c*, the detection circuitry 34*c*, the amplifier 35*c*, and the output capacitor unit 36*c* are the same as the noise detection unit 31*a*, the detection circuitry 34*a*, the amplifier 35*a*, and the output capacitor unit 36*a* in the first embodiment, and therefore the description thereof will be omitted.

The coupling capacitor unit 32*c* includes the coupling capacitor Cc. Three terminals on one side of the coupling capacitor Cc are connected to the R-phase, S-phase, and T-phase power lines, respectively. A terminal on the other side of the coupling capacitor Cc is connected to a connection point between direct-current power sources V1 and V2 connected in series. Further, the coupling capacitor unit 32*c* serves as a path that flows a compensation current between the R-phase, S-phase, and T-phase power lines and the amplifier 35*c* via the coupling capacitor Cc.

The direct-current power source unit 33c includes the direct-current power sources V1 and V2 connected in series. The direct-current power sources V1 and V2 supply a direct-current voltage to the amplifier 35c.

According to the third embodiment, the detection circuitry 34c, the amplifier 35c, and the output capacitor unit 36c constitute a noise canceller.

An operation of the power conversion system 1c according to the third embodiment will be described here.

The commercial alternating-current power source 100 supplies the alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, the common mode noise current Ic flows from the motor 200 every time a pulsed voltage is applied from the inverter unit 23. The noise detection unit 31c detects a common mode noise current in the power line input to the power converter 20 and drives the first and second transistors Tr1, Tr2. When the current detected by the noise detection unit 31c flows into the bases of the first and second transistors Tr1, Tr2, it is amplified by the first and second transistors Tr1, Tr2.

When the first transistor Tr1 is on (when the positive common mode noise current Ic is generated), the compensation current Io is supplied from the direct-current power source V1 and flows through a current path (compensation current path) from the plus terminal of the direct-current power source V1 to the minus terminal of the direct-current power source V1 via the coupling capacitor Cc, the alternating-current power source 100, the output capacitor Co, and the first transistor Tr1. In this case, the common mode noise current Ic, the compensation current Io, and the compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

When the second transistor Tr2 is on (when the negative common mode noise current Ic is generated), the compensation current Io is supplied from the direct-current power source V2 and flows through a current path (compensation current path) from the plus terminal of the direct-current power source V2 to the minus terminal of the direct-current power source V2 via the second transistor Tr2, the output capacitor Co, the alternating-current power source 100, and the coupling capacitor Cc. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the third embodiment, the noise detection unit 31c detects the common mode noise current, but the noise detection unit 31c may detect a common mode noise voltage. In that case, the noise reduction circuitry 30c may estimate the common mode noise current flowing through the path from the common mode noise voltage detected by the noise detection unit 31c and cause the compensation current to flow so as to cancel the common mode noise current.

Fourth Embodiment

Figure 4:
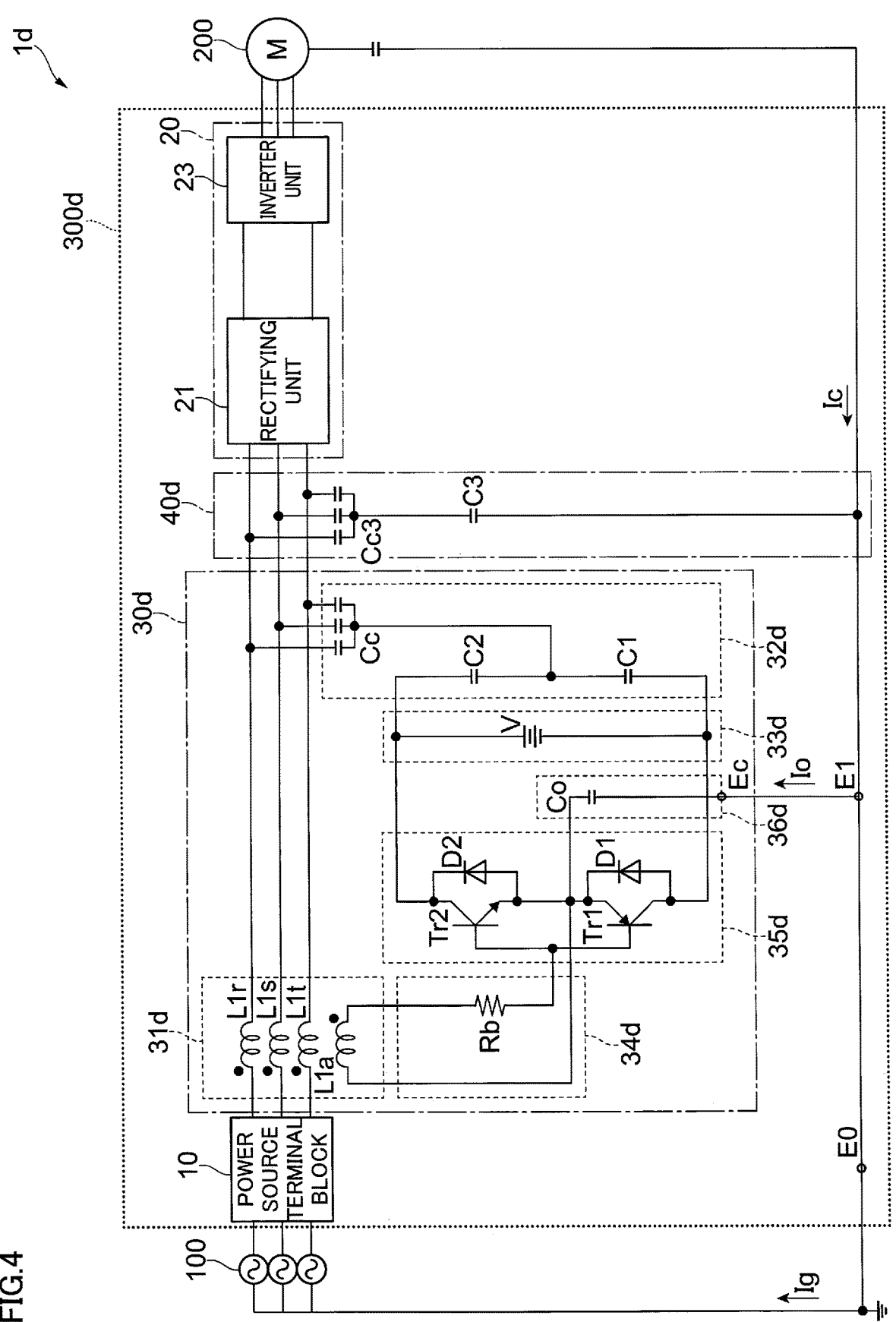
FIG. 4 is a diagram illustrating a circuitry configuration of a power conversion system according to a fourth embodiment.

FIG. 4 is a diagram illustrating a circuitry configuration of a power conversion system 1d according to a fourth embodiment. As illustrated in the drawing, the power conversion system 1d includes the alternating-current power source 100, the motor 200, and a power conversion device 300d.

As the alternating-current power source 100 and the motor 200 are the same as those described in the first embodiment, the description thereof will be omitted.

The power conversion device 300d includes the power source terminal block 10, the power converter 20, a noise reduction circuitry 30d, and a capacitor unit 40d.

As the power source terminal block 10 and the power converter 20 are the same as those described in the first embodiment, the description thereof will be omitted.

The noise reduction circuitry 30d is an active common mode noise reduction circuitry that detects, feeds back, and suppresses common mode noise. The noise reduction circuitry 30d includes a noise detection unit 31d, a coupling capacitor unit 32d, a direct-current power source unit 33d, a detection circuitry 34d, an amplifier 35d, and an output capacitor unit 36d.

The noise detection unit 31d, the coupling capacitor unit 32d, the direct-current power source unit 33d, the detection circuitry 34d, the amplifier 35d, and the output capacitor unit 36d are the same as the noise detection unit 31a, the coupling capacitor unit 32a, the direct-current power source unit 33a, the detection circuitry 34a, the amplifier 35a, and the output capacitor unit 36a in the first embodiment, and therefore the description thereof is omitted.

According to the fourth embodiment, the detection circuitry 34d, the amplifier 35d, and the output capacitor unit 36d constitute a noise canceller.

The capacitor unit 40d is connected between the power converter 20 and the noise reduction circuitry 30d. The capacitor unit 40d is a low-impedance path provided between the power line and the earth. In addition to the stray capacitance of the load, and the like, a low-impedance path for high frequencies is intentionally provided. The capacitor unit 40d includes a coupling capacitor Cc3 and a capacitor C3. Three terminals on one side of the coupling capacitor Cc3 are connected to the R-phase, S-phase, and T-phase power lines, respectively. A terminal on the other side of the coupling capacitor Cc3 is connected to a terminal on one side of the capacitor C3. A terminal on the other side of the capacitor C3 is connected to the earth.

Here, as the operation of the power conversion system 1d according to the fourth embodiment is the same as the operation of the power conversion system 1a according to the first embodiment, the description thereof will be omitted.

Furthermore, according to the fourth embodiment, the noise detection unit 31d detects the common mode noise current, but the noise detection unit 31d may detect a common mode noise voltage. In that case, the noise reduction circuitry 30d may estimate the common mode noise current flowing through the path from the common mode noise voltage detected by the noise detection unit 31d and cause the compensation current to flow so as to cancel the common mode noise current.

Fifth Embodiment

Figure 5:
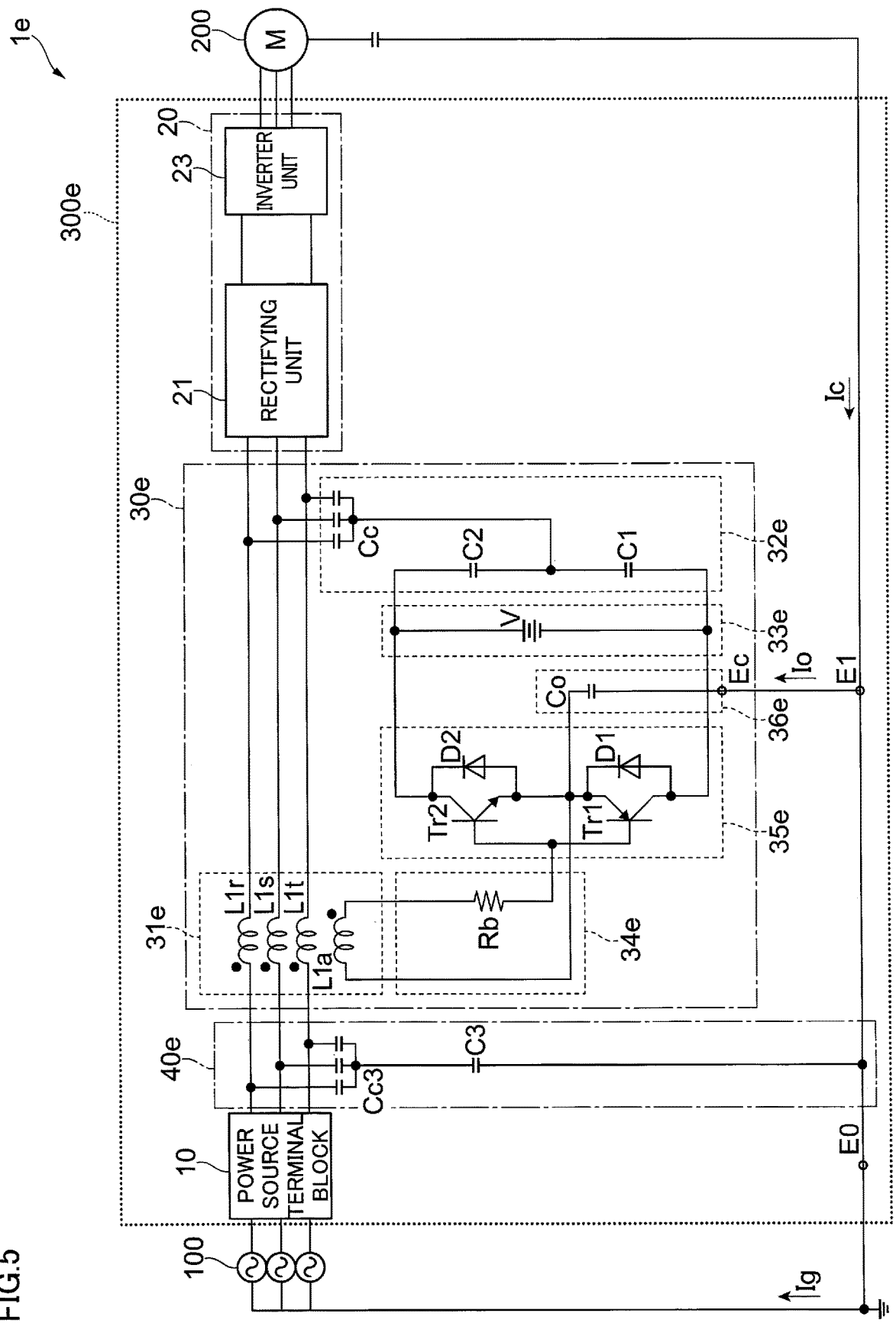
FIG. 5 is a diagram illustrating a circuitry configuration of a power conversion system according to a fifth embodiment.

FIG. 5 is a diagram illustrating a circuitry configuration of a power conversion system 1e according to a fifth embodiment. As illustrated in the drawing, the power conversion system 1e includes the alternating-current power source 100, the motor 200, and a power conversion device 300e.

As the alternating-current power source 100 and the motor 200 are the same as those described in the first embodiment, the description thereof will be omitted.

The power conversion device 300e includes the power source terminal block 10, the power converter 20, a noise reduction circuitry 30e, and a capacitor unit 40e.

As the power source terminal block 10 and the power converter 20 are the same as those described in the first embodiment, the description thereof will be omitted.

The noise reduction circuitry 30e is an active common mode noise reduction circuitry that detects, feeds back, and suppresses common mode noise. The noise reduction circuitry 30e includes a noise detection unit 31e, a coupling capacitor unit 32e, a direct-current power source unit 33e, a detection circuitry 34e, an amplifier 35e, and an output capacitor unit 36e.

The noise detection unit 31e, the coupling capacitor unit 32e, the direct-current power source unit 33e, the detection circuitry 34e, the amplifier 35e, and the output capacitor unit 36e are the same as the noise detection unit 31a, the coupling capacitor unit 32a, the direct-current power source unit 33a, the detection circuitry 34a, the amplifier 35a, and the output capacitor unit 36a in the first embodiment, and therefore the description thereof is omitted.

According to the fifth embodiment, the detection circuitry 34e, the amplifier 35e, and the output capacitor unit 36e constitute a noise canceller.

The capacitor unit 40e is the same as the capacitor unit 40d according to the fourth embodiment except that it is connected between the power source terminal block 10 and the noise reduction circuitry 30e, and therefore the description thereof will be omitted.

Here, as the operation of the power conversion system 1e according to the fifth embodiment is the same as the operation of the power conversion system 1a according to the first embodiment, the description thereof will be omitted.

Furthermore, according to the fifth embodiment, the noise detection unit 31e detects the common mode noise current, but the noise detection unit 31e may detect a common mode noise voltage. In that case, the noise reduction circuitry 30e may estimate the common mode noise current flowing through the path from the common mode noise voltage detected by the noise detection unit 31e and cause the compensation current to flow so as to cancel the common mode noise current.

Sixth Embodiment

Figure 6:
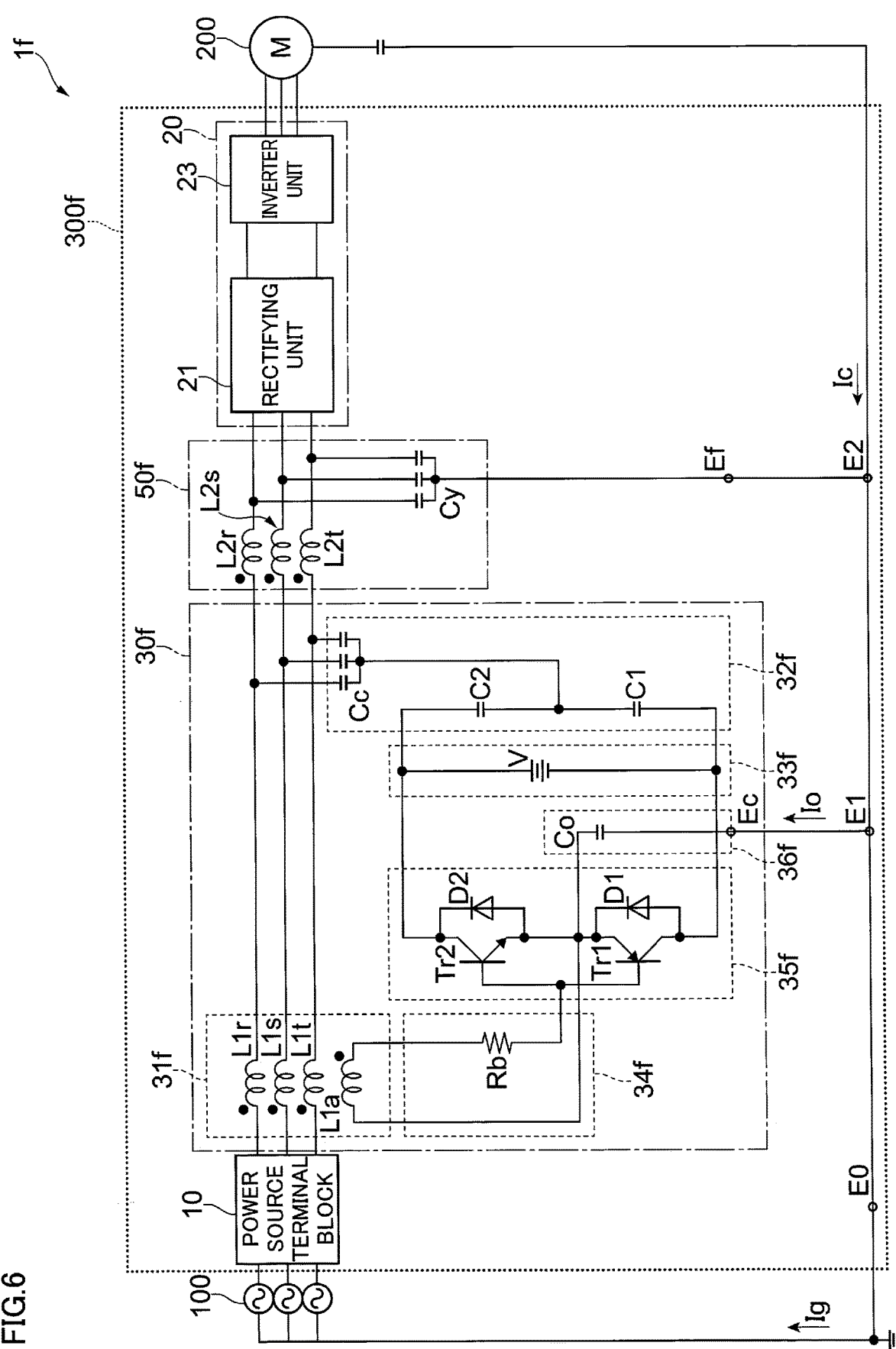
FIG. 6 is a diagram illustrating a circuitry configuration of a power conversion system according to a sixth embodiment.

FIG. 6 is a diagram illustrating a circuitry configuration of a power conversion system 1f according to a sixth embodiment. As illustrated in the drawing, the power conversion system 1f includes the alternating-current power source 100, the motor 200, and a power conversion device 300f.

As the alternating-current power source 100 and the motor 200 are the same as those described in the first embodiment, the description thereof will be omitted.

The power conversion device 300f includes the power source terminal block 10, the power converter 20, a noise reduction circuitry 30f, and a noise filter 50f.

As the power source terminal block 10 and the power converter 20 are the same as those described in the first embodiment, the description thereof will be omitted.

The noise reduction circuitry 30f is an active common mode noise reduction circuitry that detects, feeds back, and suppresses common mode noise. The noise reduction circuitry 30f includes a noise detection unit 31f, a coupling capacitor unit 32f, a direct-current power source unit 33f, a detection circuitry 34f, an amplifier 35f, and an output capacitor unit 36f.

The noise detection unit 31f, the coupling capacitor unit 32f, the direct-current power source unit 33f, the detection circuitry 34f, the amplifier 35f, and the output capacitor unit 36f are the same as the noise detection unit 31a, the coupling capacitor unit 32a, the direct-current power source unit 33a, the detection circuitry 34a, the amplifier 35a, and the output capacitor unit 36a in the first embodiment, and thus the description thereof is omitted.

According to the sixth embodiment, the detection circuitry 34f, the amplifier 35f, and the output capacitor unit 36f constitute a noise canceller.

The noise filter 50f is connected between the power converter 20 and the noise reduction circuitry 30f. The noise filter 50f reduces common mode noise. The noise filter 50f includes common mode choke coils L2r, L2s, L2t and a Y capacitor Cy. The common mode choke coils L2r, L2s, L2t are pairs of coils connected to the R-phase, S-phase, and T-phase power lines, respectively. The Y capacitor Cy is a capacitor provided between the R-phase, S-phase, and T-phase power lines and the earth. The Y capacitor Cy is connected to an earth terminal E2 of the housing via an earth terminal Ef of the noise filter 50f.

Here, the operation of the power conversion system 1f according to the sixth embodiment is the same as the operation of the power conversion system 1a according to the first embodiment, and therefore the description thereof will be omitted.

Furthermore, according to the sixth embodiment, the noise detection unit 31f detects the common mode noise current, but the noise detection unit 31f may detect a common mode noise voltage. In that case, the noise reduction circuitry 30f may estimate the common mode noise current flowing through the path from the common mode noise voltage detected by the noise detection unit 31f and cause the compensation current to flow so as to cancel the common mode noise current.

Seventh Embodiment

Figure 7:
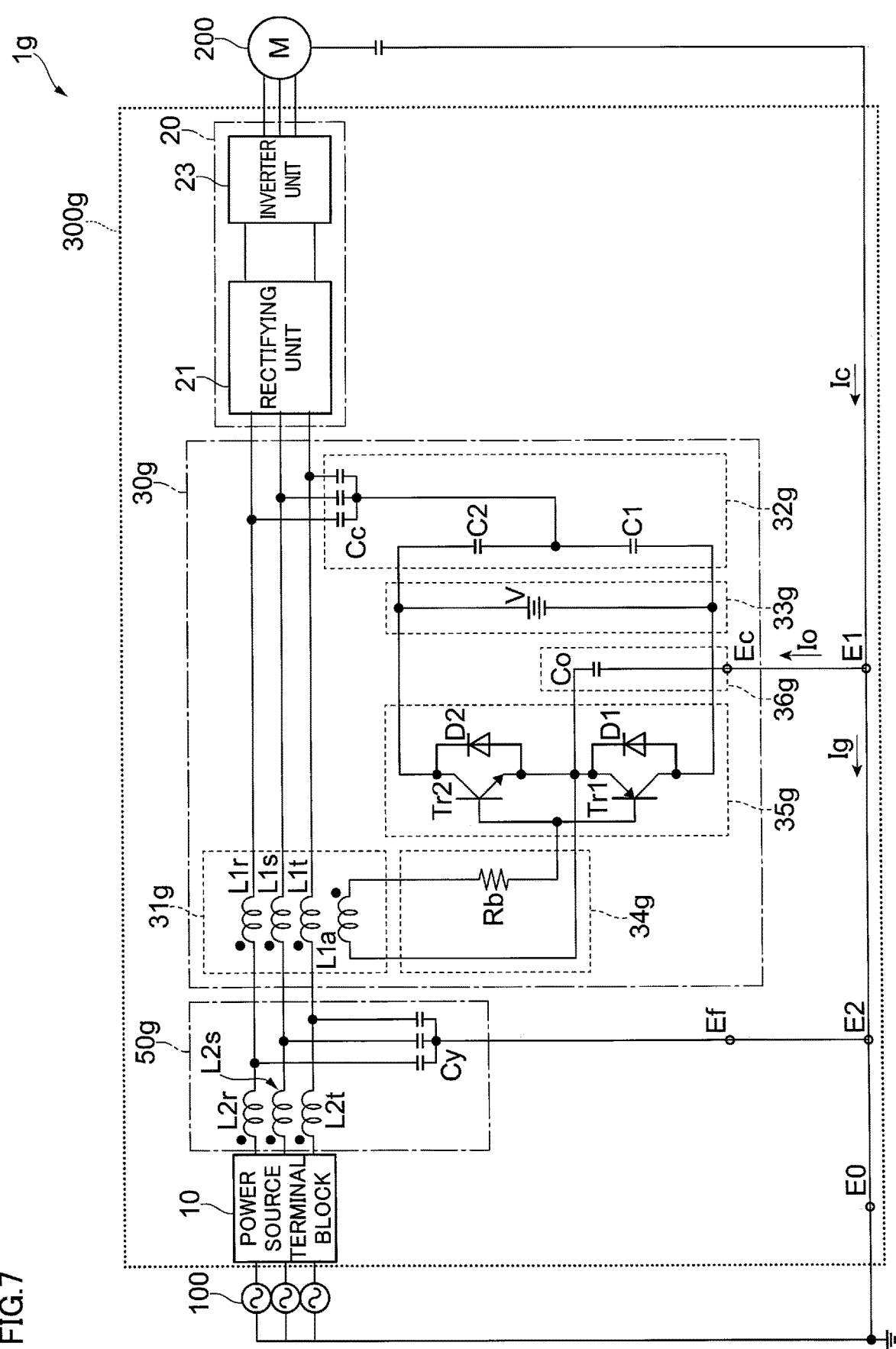
FIG. 7 is a diagram illustrating a circuitry configuration of a power conversion system according to a seventh embodiment.

FIG. 7 is a diagram illustrating a circuitry configuration of a power conversion system 1g according to a seventh embodiment. As illustrated in the drawing, the power conversion system 1g includes the alternating-current power source 100, the motor 200, and a power conversion device 300g.

As the alternating-current power source 100 and the motor 200 are the same as those described in the first embodiment, the description thereof will be omitted.

The power conversion device 300g includes the power source terminal block 10, the power converter 20, a noise reduction circuitry 30g, and a noise filter 50g.

As the power source terminal block 10 and the power converter 20 are the same as those described in the first embodiment, the description thereof will be omitted.

The noise reduction circuitry 30g is an active common mode noise reduction circuitry that detects, feeds back, and suppresses common mode noise. The noise reduction circuitry 30g includes a noise detection unit 31g, a coupling capacitor unit 32g, a direct-current power source unit 33g, a detection circuitry 34g, an amplifier 35g, and an output capacitor unit 36g.

The noise detection unit 31g, the coupling capacitor unit 32g, the direct-current power source unit 33g, the detection circuitry 34g, the amplifier 35g, and the output capacitor unit 36g are the same as the noise detection unit 31a, the coupling capacitor unit 32a, the direct-current power source unit 33a, the detection circuitry 34a, the amplifier 35a, and the output capacitor unit 36a in the first embodiment, and thus the description thereof will be omitted.

According to the seventh embodiment, the detection circuitry 34g, the amplifier 35g, and the output capacitor unit 36g constitute a noise canceller.

The noise filter 50g is the same as the noise filter 50f according to the sixth embodiment except that it is connected between the power source terminal block 10 and the noise reduction circuitry 30g, and therefore the description thereof will be omitted.

Here, the operation of the power conversion system 1g according to the seventh embodiment is the same as the operation of the power conversion system 1a according to the first embodiment, and therefore the description thereof will be omitted.

Furthermore, according to the seventh embodiment, the noise detection unit 31g detects the common mode noise current, but the noise detection unit 31g may detect a common mode noise voltage. In that case, the noise reduction circuitry 30g may estimate the common mode noise current flowing through the path from the common mode noise voltage detected by the noise detection unit 31g and cause the compensation current to flow so as to cancel the common mode noise current.

Eighth Embodiment

Figure 8:
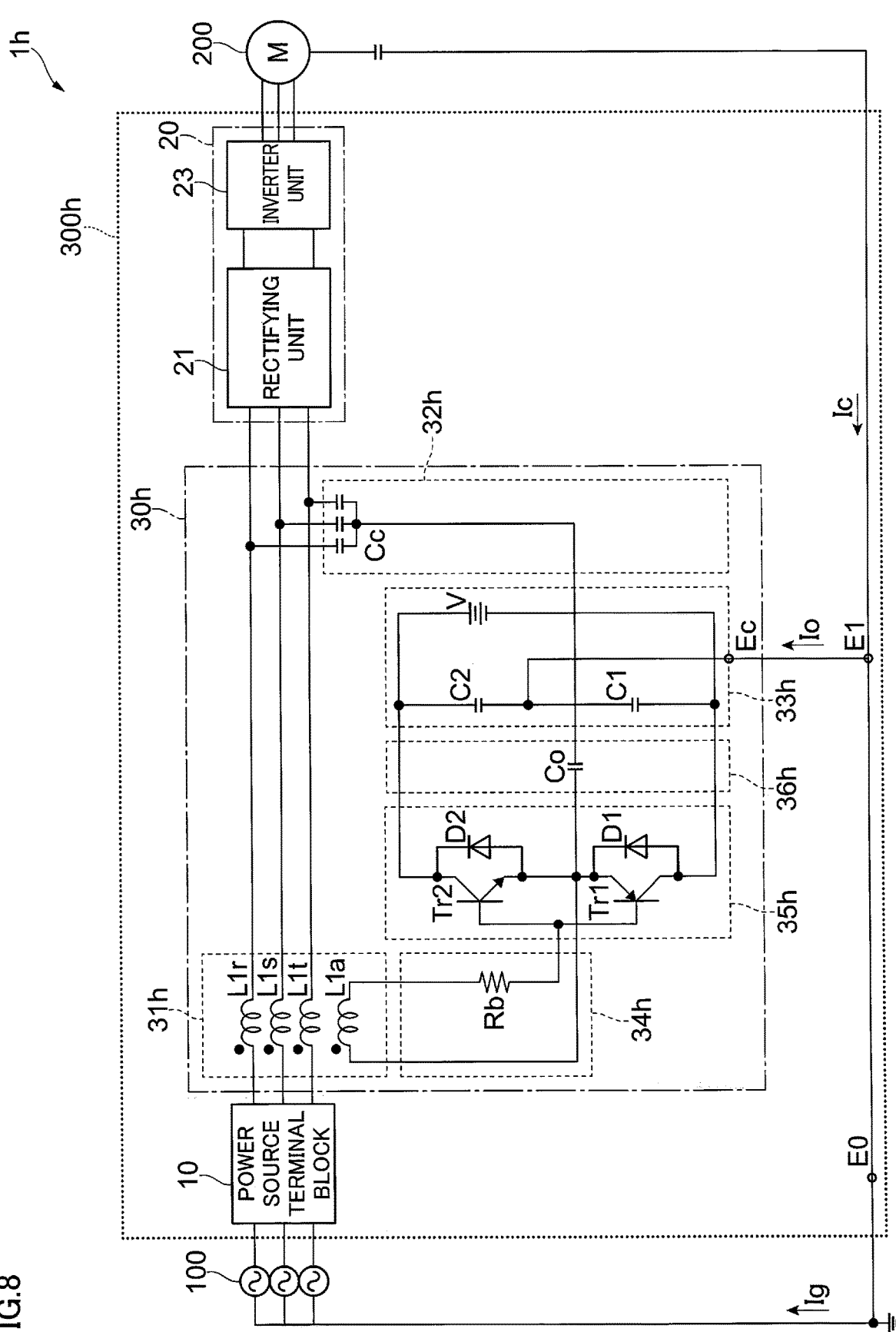
FIG. 8 is a diagram illustrating a circuitry configuration of a power conversion system according to an eighth embodiment.

FIG. 8 is a diagram illustrating a circuitry configuration of a power conversion system 1h according to an eighth embodiment. As illustrated in the drawing, the power conversion system 1h includes the alternating-current power source 100, the motor 200, and a power conversion device 300h.

As the alternating-current power source 100 and the motor 200 are the same as those described in the first embodiment, the description thereof will be omitted.

The power conversion device 300h includes the power source terminal block 10, the power converter 20, and a noise reduction circuitry 30h.

As the power source terminal block 10 and the power converter 20 are the same as those described in the first embodiment, the description thereof will be omitted.

The noise reduction circuitry 30h is an active common mode noise reduction circuitry that detects, feeds back, and suppresses common mode noise. The noise reduction circuitry 30h includes a noise detection unit 31h, a coupling capacitor unit 32h, a direct-current power source unit 33h, a detection circuitry 34h, an amplifier 35h, and an output capacitor unit 36h.

The noise detection unit 31h detects a common mode noise current. An example of the noise detection unit 31h is a detection core. The detection core may include a conductive wire to be passed through a toroidal core, but the one including the coils (windings) L1r, L1s, L1t, L1a is taken here as an example. The noise detection unit 31h has the same configuration as that of the noise detection unit 31a according to the first embodiment, but the polarity of the coil L1a is opposite to that in the first embodiment.

The coupling capacitor unit 32h includes the coupling capacitor Cc. Three terminals on one side of the coupling capacitor Cc are connected to the R-phase, S-phase, and T-phase power lines, respectively. A terminal on the other side of the coupling capacitor Cc is connected to a terminal on one side of the output capacitor Co.

The direct-current power source unit 33h includes the direct-current power source V and the capacitors C1, C2. The direct-current power source V supplies a direct-current voltage to the amplifier 35h.

As the detection circuitry 34h and the amplifier 35h are the same as the detection circuitry 34a and the amplifier 35a according to the first embodiment, the description thereof will be omitted.

The output capacitor unit 36h includes the output capacitor Co. One end of the output capacitor Co is connected to the connection point between the first and second transistors Tr1, Tr2 on the emitter side, and the other end is connected to the coupling capacitor unit 32h. Furthermore, the form in which the output capacitor unit 36h does not exist may be adopted.

The terminal of the first transistor Tr1 on the collector side, which is connected to the minus side of the direct-current power source V, may be connected to the earth via an impedance element.

According to the eighth embodiment, the detection circuitry 34h, the amplifier 35h, and the output capacitor unit 36h constitute a noise canceller.

Here, an operation of the power conversion system 1h according to the eighth embodiment will be described.

The commercial alternating-current power source 100 supplies the alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, the common mode noise current Ic flows from the motor 200 every time a pulsed voltage is applied from the inverter unit 23. The noise detection unit 31h detects a common mode noise current in the power line input to the power converter 20 and drives the first and second transistors Tr1, Tr2. When the current detected by the noise detection unit 31h flows into the bases of the first and second transistors Tr1, Tr2, it is amplified by the first and second transistors Tr1, Tr2.

When the first transistor Tr1 is on (when the negative common mode noise current Ic is generated), the compensation current Io is supplied from the direct-current power source V and flows through a current path (compensation current path) from the plus terminal of the direct-current power source V to the minus terminal of the direct-current power source V via the capacitor C2, the alternating-current power source 100, the coupling capacitor Cc, the output capacitor Co, and the first transistor Tr1. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

When the second transistor Tr2 is on (when the positive common mode noise current Ic is generated), the compensation current Io is supplied from the direct-current power source V and flows through a current path (compensation current path) from the plus terminal of the direct-current power source V to the minus terminal of the direct-current power source V via the second transistor Tr2, the output capacitor Co, the coupling capacitor Cc, the alternating-current power source 100, and the capacitor C1. In this case, the common mode noise current Ic, the compensation current Io, and the compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the eighth embodiment, the noise detection unit 31h detects the common mode noise current, but the noise detection unit 31h may detect a common mode noise voltage. In that case, the noise reduction circuitry 30h may estimate the common mode noise current flowing through the path from the common mode noise voltage detected by the noise detection unit 31h and cause the compensation current to flow so as to cancel the common mode noise current.

Furthermore, according to the eighth embodiment, the form may be adopted in which one of the capacitors C1, C2 is removed and the direct-current power source V side, to which the removed capacitor is connected, is directly connected to the earth.

Ninth Embodiment

Figure 9:
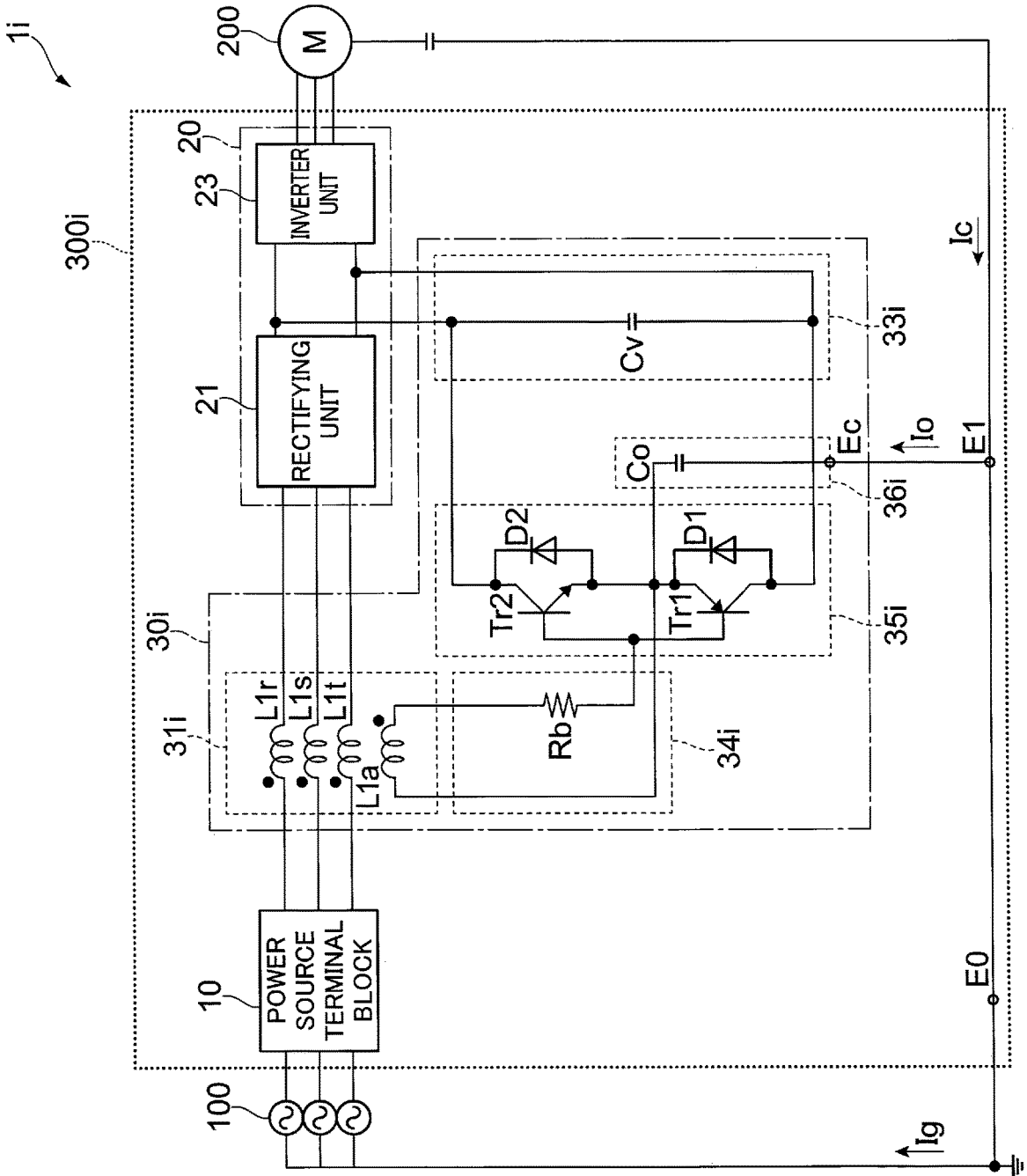
FIG. 9 is a diagram illustrating a circuitry configuration of a power conversion system according to a ninth embodiment.

FIG. 9 is a diagram illustrating a circuitry configuration of a power conversion system 1i according to a ninth embodiment. As illustrated in the drawing, the power conversion system 1i includes the alternating-current power source 100, the motor 200, and a power conversion device 300i.

As the alternating-current power source 100 and the motor 200 are the same as those described in the first embodiment, the description thereof will be omitted.

The power conversion device 300i includes the power source terminal block 10, the power converter 20, and a noise reduction circuitry 30i.

As the power source terminal block 10 and the power converter 20 are the same as those described in the first embodiment, the description thereof will be omitted.

The noise reduction circuitry 30i is an active common mode noise reduction circuitry that detects, feeds back, and suppresses common mode noise. The noise reduction circuitry 30i includes a noise detection unit 31i, a direct-current power source unit 33i, a detection circuitry 34i, an amplifier 35i, and an output capacitor unit 36i.

The noise detection unit 31i, the detection circuitry 34i, the amplifier 35i, and the output capacitor unit 36i are the same as the noise detection unit 31a, the detection circuitry 34a, the amplifier 35a, and the output capacitor unit 36a according to the first embodiment, and therefore the description thereof will be omitted.

The direct-current power source unit 33i includes a capacitor Cv connected in parallel to the amplifier 35i. The capacitor Cv is connected between the rectifying unit 21 and the inverter unit 23 such that one end thereof is connected to an upper power line in the power converter 20 and the other end thereof is connected to a lower power line in the power converter 20 so that the capacitor Cv functions as a power source of a DC link voltage of the power converter 20.

According to the ninth embodiment, the detection circuitry 34i, the amplifier 35i, and the output capacitor unit 36i constitute a noise canceller.

Here, an operation of the power conversion system 1i according to the ninth embodiment will be described.

The commercial alternating-current power source 100 supplies the alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, the common mode noise current Ic flows from the motor 200 every time a pulsed voltage is applied from the inverter unit 23. The noise detection unit 31i detects a common mode noise current in a power line input to the power converter 20 and drives the first and second transistors Tr1, Tr2. When the current detected by the noise detection unit 31i flows into the bases of the first and second transistors Tr1, Tr2, it is amplified by the first and second transistors Tr1, Tr2.

When the first transistor Tr1 is on (when the positive common mode noise current Ic is generated), the compensation current Io flows from the earth through a current path (compensation current path) to the lower power line in the power converter 20 via the output capacitor Co and the first transistor Tr1 and further to the alternating-current power source 100 side. In this case, the common mode noise current Ic, the compensation current Io, and the compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

When the second transistor Tr2 is on (when the negative common mode noise current Ic is generated), the compensation current Io flows from the upper power line in the power converter 20 through a current path (compensation current path) to the earth via the second transistor Tr2 and the output capacitor Co and further to the alternating-current power source 100 side. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the ninth embodiment, the noise detection unit 31i detects the common mode noise current, but the noise detection unit 31i may detect a common mode noise voltage. In that case, the noise reduction circuitry 30*i* may estimate the common mode noise current flowing through the path from the common mode noise voltage detected by the noise detection unit 31*i* and cause the compensation current to flow so as to cancel the common mode noise current.

Tenth Embodiment

Figure 10:
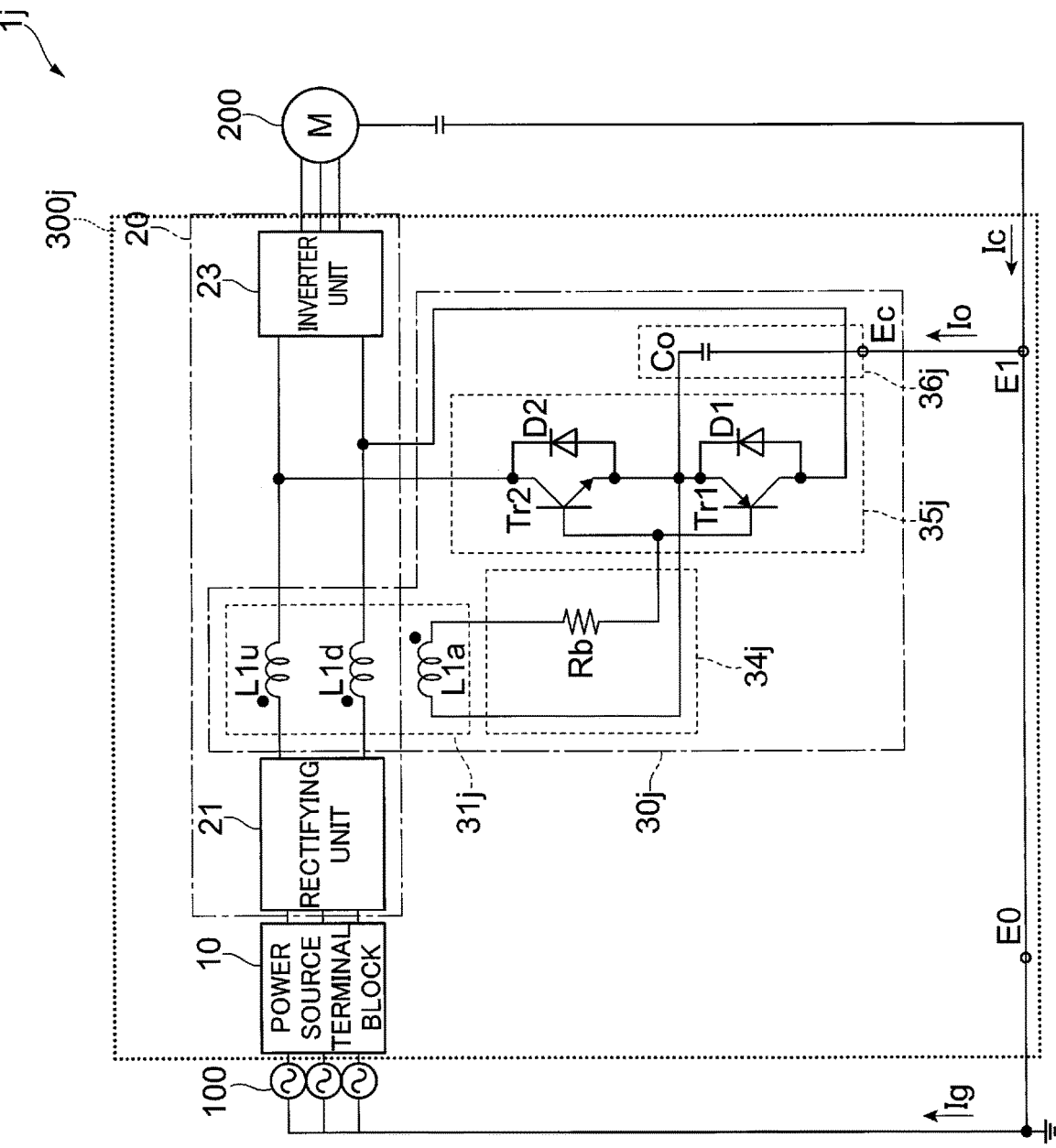
FIG. 10 is a diagram illustrating a circuitry configuration of a power conversion system according to a tenth embodiment.

FIG. 10 is a diagram illustrating a circuitry configuration of a power conversion system 1*j* according to a tenth embodiment. As illustrated in the drawing, the power conversion system 1*j* includes the alternating-current power source 100, the motor 200, and a power conversion device 300*j*.

As the alternating-current power source 100 and the motor 200 are the same as those described in the first embodiment, the description thereof will be omitted.

The power conversion device 300*j* includes the power source terminal block 10, the power converter 20, and a noise reduction circuitry 30*j*.

As the power source terminal block 10 and the power converter 20 are the same as those described in the first embodiment, the description thereof will be omitted.

The noise reduction circuitry 30*j* is an active common mode noise reduction circuitry that detects, feeds back, and suppresses common mode noise. The noise reduction circuitry 30*j* includes a noise detection unit 31*j*, a detection circuitry 34*j*, an amplifier 35*j*, and an output capacitor unit 36*j*.

The detection circuitry 34*j* and the output capacitor unit 36*j* are the same as the detection circuitry 34*a* and the output capacitor unit 36*a* in the first embodiment, and thus the description thereof will be omitted.

The noise detection unit 31*j* detects the common mode noise current flowing through a power line in the power converter 20. An example of the noise detection unit 31*j* is a detection core. The detection core may include a conductive wire to be passed through a toroidal core, but the one including coils (windings) L1*u*, L1*d*, L1*a* will be described here as an example.

The coils L1*u*, L1*d* are coils connected in series for the upper and lower power lines, respectively. Here, the coils refer to conductive wires wound in a spiral (loop) manner to constitute an inductor. The coils L1*u*, L1*d* are wound around one toroidal core to be adjacent to each other. Therefore, the coils L1*u*, L1*d* are magnetically coupled to each other (magnetic coupling). Further, the coils L1*u*, L1*d* are wound to have the polarities indicated by "•" in FIG. 10.

The coil L1*a* is provided to be magnetically coupled to the coils L1*u*, L1*d* (magnetic coupling). For example, the coil L1*a* is wound around one toroidal core to be adjacent to the coils L1*u*, L1*d*. Alternatively, the coils L1*u*, L1*d* may be wound around one toroidal core to be adjacent to each other, and the coil L1*a* may be wound to be overlapped with the coils L1*u*, L1*d*. Further, the coil L1*a* is wound to have the polarity indicated by "•" in FIG. 10.

The common mode noise current is a high-frequency current that leaks to the ground via a stray capacitance of the motor 200, or the like, due to switching of the switching element St of the inverter unit 23. Therefore, the common mode noise current flows between the R-phase, S-phase, and T-phase power lines and the ground (earth).

When the common mode noise current flows through the coils L1*u*, L1*d*, the current proportional to the common mode noise current is induced in the coil L1*a* via the toroidal core. In this case, the coils L1*u*, L1*d* and the coil L1*a* function as a current transformer and constitute a detection transformer that detects the common mode noise current.

The amplifier 35*j* is connected between the rectifying unit 21 and the inverter unit 23 such that one end thereof is connected to the upper power line in the power converter 20 and the other end thereof is connected to the lower power line in the power converter 20 so that the amplifier 35*j* receives the supply of a DC link voltage of the power converter 20.

According to the tenth embodiment, the detection circuitry 34*j*, the amplifier 35*j*, and the output capacitor unit 36*j* constitute a noise canceller.

Here, an operation of the power conversion system 1*j* according to the tenth embodiment will be described.

The commercial alternating-current power source 100 supplies the alternating-current voltage to the power converter 20 via the power source terminal block 10. In the power converter 20, the rectifying unit 21 rectifies the alternating-current voltage supplied from the alternating-current power source 100 into a direct-current voltage. The inverter unit 23 supplies the alternating-current voltage to the motor 200 by on/off control of the switching element.

In such a case, as illustrated in the drawing, the common mode noise current Ic flows from the motor 200 every time a pulsed voltage is applied from the inverter unit 23. The noise detection unit 31*j* detects the common mode noise current in the power line in the power converter 20 and drives the first and second transistors Tr1, Tr2. When the current detected by the noise detection unit 31*j* flows into the bases of the first and second transistors Tr1, Tr2, it is amplified by the first and second transistors Tr1, Tr2.

When the first transistor Tr1 is on (when the positive common mode noise current Ic is generated), the compensation current Io flows from the earth through a current path (compensation current path) to the lower power line in the power converter 20 via the output capacitor Co and the first transistor Tr1 and further to the alternating-current power source 100 side. In this case, the common mode noise current Ic, the compensation current Io, and the compensated common mode noise current Ig flow in the directions of the arrows in the drawing. Then, the compensation current Io is subtracted from the common mode noise current Ic from the motor 200 so that the common mode noise current Ic is reduced. In other words, the compensation current Io compensates for the common mode noise current Ic.

When the second transistor Tr2 is on (when the negative common mode noise current Ic is generated), the compensation current Io flows from the upper power line in the power converter 20 through a current path (compensation current path) to the earth via the second transistor Tr2 and the output capacitor Co and further to the alternating-current power source 100 side. In this case, the common mode noise current Ic, the compensation current Io, and the compensated common mode noise current Ig flow in the directions opposite to the directions of the arrows in the drawing. Then, the negative compensation current Io is subtracted from the negative common mode noise current Ic from the motor 200 so that the common mode noise current Ic is reduced. In other words, the compensation current Io compensates for the common mode noise current Ic.

As described above, in both cases where the first transistor Tr1 is on and where the second transistor Tr2 is on, the compensated common mode noise current Ig flows through the alternating-current power source 100.

Furthermore, according to the tenth embodiment, the noise detection unit 31*j* detects the common mode noise current, but the noise detection unit 31*j* may detect a common mode noise voltage. In that case, the noise reduction circuitry 30*j* may estimate the common mode noise current flowing through the path from the common mode noise voltage detected by the noise detection unit 31*j* and cause the compensation current to flow so as to cancel the common mode noise current.

[Relationship Between Voltage of Direct-Current Power Source Unit and Impedance of Compensation Current Path]

Figure 11:
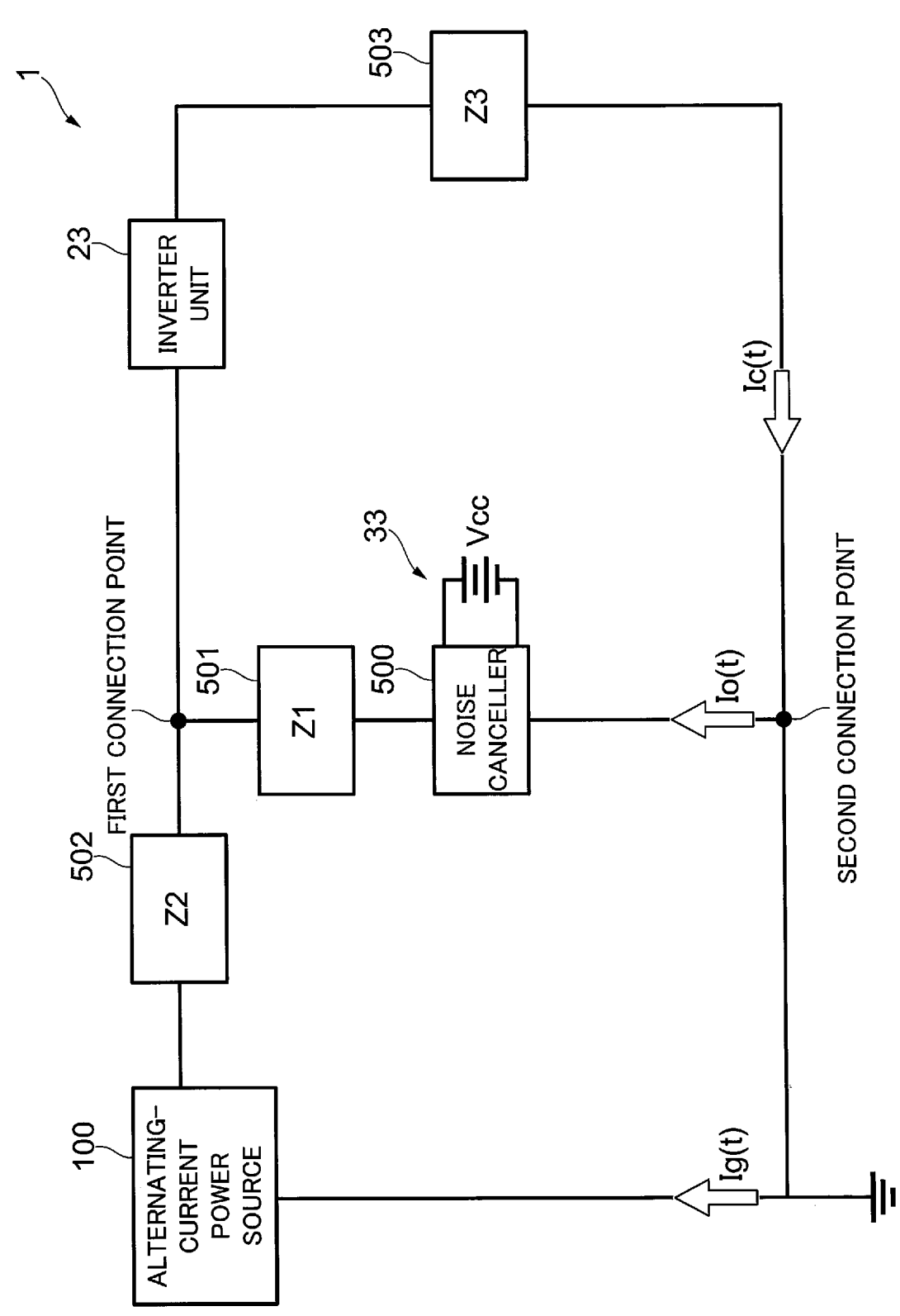
FIG. 11 is a diagram schematically illustrating a circuitry configuration of the power conversion system according to the present embodiment.

FIG. 11 is a diagram schematically illustrating a circuitry configuration of a power conversion system 1 according to the present embodiment. The power conversion system 1 corresponds to the power conversion systems 1*a* to 1*j* in FIGS. 1 to 10. As illustrated in the drawing, the power conversion system 1 includes the alternating-current power source 100, an inverter unit 23, a noise canceller 500, and path impedances 501 to 503. Furthermore, power is supplied to the noise canceller 500 from a direct-current power source unit 33. Hereinafter, the impedances of the path impedances 501, 502, 503 are denoted by Z1, Z2, Z3, respectively, and the voltage of the direct-current power source unit 33 is denoted by Vcc. Moreover, the sum of the voltage of the direct-current power source V1 and the voltage of the direct-current power source V2 is denoted by Vcc in the third embodiment (FIG. 3), and the voltage of the direct-current power source V is denoted by Vcc in the other embodiments.

The path impedance 501 is the impedance of the path connecting the power line and the earth via the noise canceller 500. Furthermore, the connection point between this path and the power line is a first connection point, and the connection point between this path and the earth is a second connection point. Although the path impedance 501 is illustrated on only one side of the noise canceller 500, it may be on both sides.

The path impedance 502 corresponds to the impedance of the noise detection unit 31*a* and the alternating-current power source 100 in FIG. 1, the impedance of the noise detection unit 31*b* and the alternating-current power source 100 in FIG. 2, and the impedance of the noise detection unit 31*c* and the alternating-current power source 100 in FIG. 3. The path impedance 502 corresponds to the impedance of the noise detection unit 31*d* and the alternating-current power source 100 in FIG. 4 and the combined impedance of the impedance of the noise detection unit 31*e* and the alternating-current power source 100 and the impedance of the capacitor unit 40*e* in FIG. 5. The path impedance 502 corresponds to the impedance of the noise detection unit 31*f* and the alternating-current power source 100 in FIG. 6 and the combined impedance of the impedance of the noise detection unit 31*g* and the alternating-current power source 100 and the impedance of the noise filter 50*g* in FIG. 7. The path impedance 502 corresponds to the impedance of the noise detection unit 31*h* and the alternating-current power source 100 in FIG. 8, the impedance of the noise detection unit 31*i*, the alternating-current power source 100, and the rectifying unit 21 in FIG. 9, and the impedance of the noise detection unit 31*j*, the alternating-current power source 100, and the rectifying unit 21 in FIG. 10. In other words, the path impedance 502 is an impedance on a side closer to the alternating-current power source 100 than the first connection point and the second connection point.

In FIGS. 1 to 3, 5, 7, and 8, the path impedance 503 corresponds to the impedance due to the stray capacitance of the motor 200 and the impedances of the rectifying unit 21, the inverter unit 23, the cable, or the like, between the inverter unit 23 and the load. In FIG. 4, the path impedance 503 corresponds to the combined impedance of the impedance due to the stray capacitance of the motor 200, the impedance of the rectifying unit 21, the inverter unit 23, the cable, or the like, between the inverter unit 23 and the load, and the impedance of the capacitor unit 40*d*. In FIG. 6, the path impedance 503 corresponds to the combined impedance of the impedance due to the stray capacitance of the motor 200, the impedance of the rectifying unit 21, the inverter unit 23, the cable, or the like, between the inverter unit 23 and the load, and the impedance of the noise filter 50*f*. In FIGS. 9 and 10, the path impedance 503 corresponds to the impedance due to the stray capacitance of the motor 200 and the impedance of the inverter unit 23 and the cable, or the like, between the inverter unit 23 and the load. That is, the path impedance 503 is an impedance on a side closer to the power converter 20 than the first connection point and the second connection point.

Furthermore, in the power conversion system 1, a common mode noise current Ic(t) flows from the inverter unit 23 in the direction of an arrow in the drawing as a positive direction. Further, the noise canceller 500 causes a compensation current Io(t) to flow in the direction of an arrow in the drawing as a positive direction. Accordingly, a compensated common mode noise current Ig(t) obtained by subtracting the compensation current Io(t) from the common mode noise current Ic(t) flows in the direction of an arrow in the drawing as a positive direction. Hereinafter, the current values of the common mode noise current Ic(t), the compensation current Io(t), and the compensated common mode noise current Ig(t) will be denoted by Ic(t), Io(t), and Ig(t), respectively. Ig(t) is a waveform obtained by subtracting the waveform Io(t) from the waveform Ic(t) and therefore is expressed on the time axis to indicate the waveform.

Furthermore, to be precise, Io(t) is branched from the first connection point to the path impedance 502 side and the path impedance 503 side in accordance with the path impedance 502 and the path impedance 503, and Io(t) branched to the path impedance 502 side is subtracted from Ic(t) to obtain Ig(t).

In FIG. 11, the voltage Vcc of the direct-current power source unit 33 is a voltage necessary for the noise canceller 500 to perform an operation.

A voltage V(t) generated in the path through which Io(t) flows in the direction to subtract Ic(t) is $$V(t) = 2 * (Z1 * Io(t) - Z2 * Ig(t)) \tag{1}$$

Therefore, the condition of the voltage necessary for the noise canceller 500 to operate is the following inequation.

$$\text{Voltage } Vcc \geq \text{maximum value of absolute value of voltage } V(t) \tag{2}$$

As the voltage V(t) has a waveform that oscillates between positive and negative in accordance with the direction of the current, the maximum value of the absolute value is used for compensation regardless of the direction of the current.

In addition, when it is considered that Io(t) branched to the path impedance 503 side is extremely small and may be ignored, Ig(t)=Ic(t)−Io(t) is obtained, and thus the following equation may be obtained by modifying Equation (1).

$$V(t) = 2 * ((Z1 + Z2) * Io(t) - Z2 * Ic(t)) \tag{3}$$

Even in this case, the condition of the voltage necessary for the noise canceller 500 to operate is Inequation (2).

Furthermore, Ic(t) is a common mode noise current generated in the cycle corresponding to the carrier frequency of the inverter unit 23 and has a waveform in which a difference between a maximum value and an effective value in one cycle is large in a case where the noise filter is not interposed. Further, in a rare case where a waveform having a maximum value, which is extremely large as compared with other cycles, is input, it is not necessary to design in accordance with the maximum value.

Therefore, for example, the condition of the voltage necessary for the noise canceller 500 to operate may be set in accordance with V(t) in the following inequation.

$$\text{Voltage } Vcc \geq \text{ maximum value of quasi-peak value of voltage V}(t) \quad (4)$$

The detector for measuring the quasi-peak value takes an intermediate value between the maximum value and the average value by taking the charging time constant sufficiently larger than the discharge time constant, and therefore even when the maximum value of the quasi-peak value is a value in a rare case where a waveform having a maximum value, which is extremely large as compared with other cycles, is input, for example, if the carrier frequency is high and the maximum value in a normal cycle and the maximum value of the quasi-peak value are substantially the same when the small voltage Vcc in the condition of Inequation (4) is selected, the noise canceller 500 may be operated in a normal cycle without reacting even when a waveform having a maximum value, which is extremely large as compared with other cycles, is mixed in a rare case.

Furthermore, the quasi-peak value (QP: Quasi-peak) is a value measured based on a quasi-peak value measurement method defined by the international standard CISPR (Comite International Special des Perturbations Radioelectriques) defined by the CISPR.

Further, for example, the condition of the voltage necessary for the noise canceller 500 to operate may be set in accordance with V(t) in the following inequation.

$$\text{Voltage } Vcc \geq \sqrt{2} \text{ times effective value of voltage V}(t) \quad (5)$$

For example, when Ic(t) flows through the noise filter, becomes a waveform close to a sine wave, and the maximum value in a normal cycle and √2 times the effective value become substantially the same, the noise canceller 500 may be operated in a normal cycle without reacting even when a waveform having a maximum value, which is extremely large as compared with other cycles, is mixed in a rare case.

Furthermore, according to the present embodiment, in order to enable use of an element having a low voltage resistance in the noise canceller 500, a voltage lower than the peak value of the DC link voltage of the power converter 20 is used as the voltage Vcc of the direct-current power source unit 33. The voltage lower than the peak value of the DC link voltage of the power converter 20 may be a voltage obtained by reducing the DC link voltage of the power converter 20 by a transformer, a Zener diode, or the like. Alternatively, the voltage lower than the peak value of the DC link voltage of the power converter 20 may be a voltage obtained from a separately prepared power source.

Therefore, according to the present embodiment, a case where the voltage Vcc of the direct-current power source unit 33 is less than ⅔ of the peak value of the DC link voltage of the power converter 20 will be considered. In that case, the voltage Vcc of the direct-current power source unit 33 is set so as to satisfy any one of Inequation (2), Inequation (4), and Inequation (5). In addition, the relationship among Inequation (2), Inequation (4), and Inequation (5) is that the right side of Inequation (2)>the right side of Inequation (4) and the right side of Inequation (2)>the right side of Inequation (5).

In a case where the influence of the common mode current flowing in the alternating-current power source 100 is set to be equal to or less than a predetermined noise level, the voltage Vcc when Io(t) for setting the influence to be equal to or less than the predetermined noise level is caused to flow may be set to satisfy any one of Inequation (2), Inequation (4), and Inequation (5). Here, the "predetermined noise level" is merely an example, but refers to a standard value defined by a standard such as the international standard CISPR or Electrical Appliance and Material Safety Act. This standard value indicates a noise level flowing out to the alternating-current power source 100. On the other hand, when the noise filter is connected on the side closer to the alternating-current power source 100 than the noise canceller 500, the compensated common mode noise current Ig(t) is further attenuated by the noise filter. Therefore, when there is a noise filter, the "predetermined noise level" refers to a noise level in consideration of attenuation by the noise filter.

Furthermore, according to the present embodiment, only the case where the voltage Vcc of the direct-current power source unit 33 is less than ⅔ of the peak value of the DC link voltage of the power converter 20 is considered. This is because, since a voltage Vcom of a common mode noise source changes by ⅓ of the DC link voltage, the compensation current may flow without considering the relationship between the voltage Vcc and the impedance Z when the voltage Vcc is +⅓ of the DC link voltage. The voltage Vcom of the common mode noise source is a potential at the neutral point of the motor 200, which is generated when the motor 200 is driven by the inverter unit 23.

Furthermore, in the above conditional expression, the denominator on the right side is multiplied by 2. This is because both the voltage for causing the compensation current to flow when the positive common mode noise current flows and the voltage for causing the compensation current to flow when the negative common mode noise current flows are matched.

Here, when the noise canceller 500 is normally operating, Io(t) approaches Ic(t), and therefore the Z2 term in Equation (1) becomes smaller. In actuality, since Ic(t)≠Io(t), the Z2 term slightly remains, but the influence is small.

Therefore, it is possible to design the voltage in accordance with the following equation obtained by removing the Z2 term from the relational expression of Equation (1).

$$V(t) = 2 * Z1 * Io(t) \quad (6)$$

Next, the setting of a specific value for the voltage Vcc of the direct-current power source unit 33 will be described.

For example, the voltage Vcc of the direct-current power source unit 33 may be 250 V or less. Accordingly, the voltage resistance of the components constituting the noise canceller 500 may be reduced, and cost reduction and size reduction may be achieved.

Furthermore, the voltage Vcc of the direct-current power source unit 33 may be 100 V or less. Accordingly, a high-speed transistor with a low voltage resistance may be used in the noise canceller 500 so that the compensation band may be extended.

Further, the voltage Vcc of the direct-current power source unit 33 may be 30 V or less. Accordingly, since a high-speed operational amplifier may be used in the noise canceller 500, compensation in a wider band may be performed.

[Limitation of Circuitry Configuration]

Figure 12:
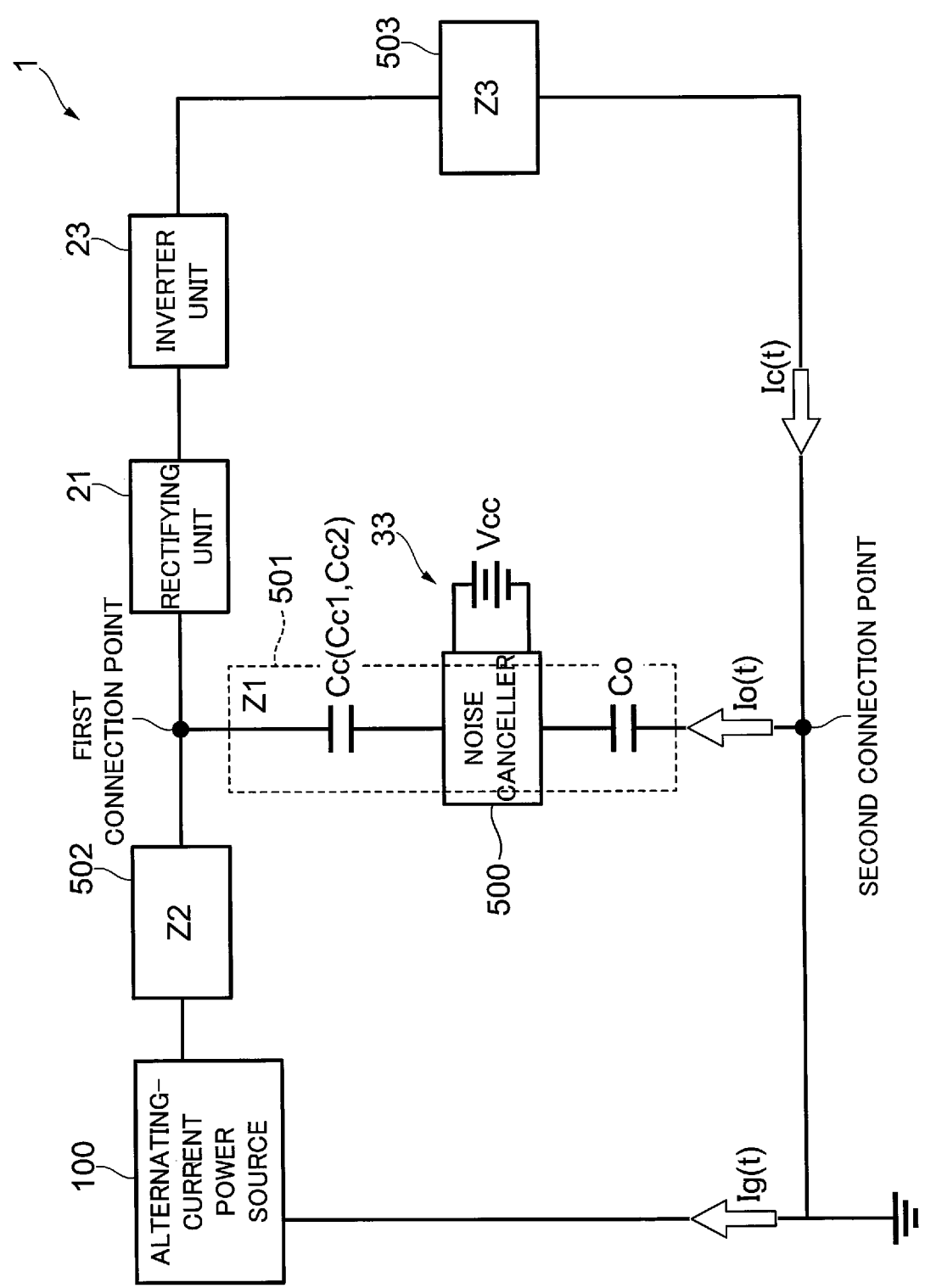
FIG. 12 is a diagram schematically illustrating a circuitry configuration of the power conversion system according to the present embodiment.

FIG. 12 is also a diagram schematically illustrating a circuitry configuration of the power conversion system 1 according to the present embodiment. The power conversion system 1 corresponds to the power conversion systems 1a to 1g in FIGS. 1 to 7. As illustrated in FIG. 1, the power conversion system 1 includes the alternating-current power source 100, the rectifying unit 21, the inverter unit 23, the noise canceller 500, and the path impedances 501 to 503.

FIG. 12 limits the circuitry configuration and the impedance Z1 in FIG. 11. As the common mode noise current Ic(t) has a plurality of frequency components and the impedance Z1 also has a frequency property, it is considered that the viewpoint of frequencies is also necessary to consider the necessary voltage.

In FIG. 12, the circuitry configuration is such that the noise canceller 500 is connected on the side closer to the alternating-current power source 100 than the rectifying unit 21 and is connected to the power line and the earth via the coupling capacitors Cc (Cc1, Cc2) and the output capacitor Co at the first connection point and the second connection point. Thus, the circuitry configuration is limited to a current compensation type canceller circuitry. With this limitation, the impedance Z1 may be defined as a capacitor.

[Load System]

Figure 13:
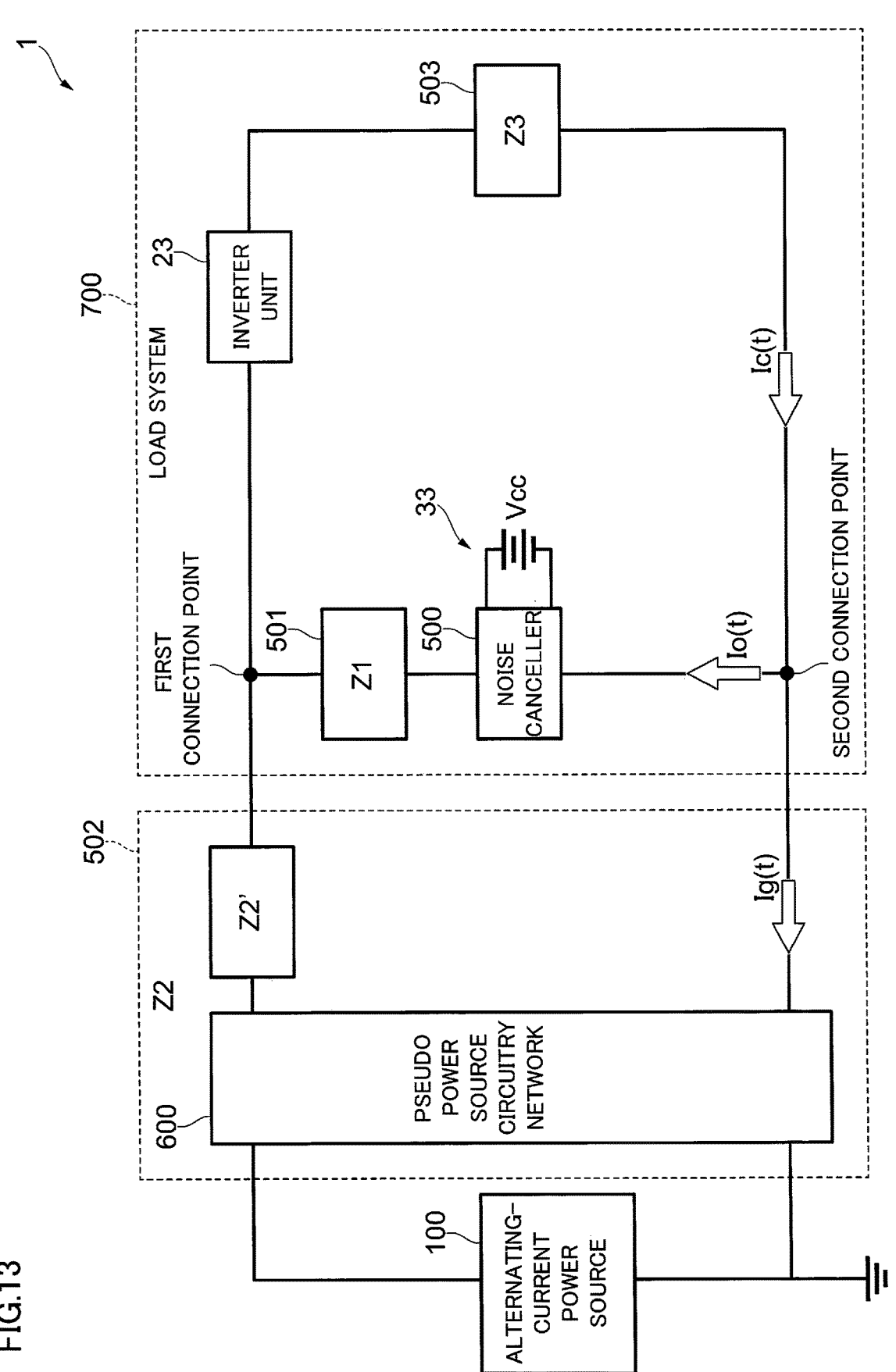
FIG. 13 is a diagram schematically illustrating a circuitry configuration of the power conversion system according to the present embodiment.

FIG. 13 is also a diagram schematically illustrating a circuitry configuration of the power conversion system 1 according to the present embodiment. The power conversion system 1 corresponds to the power conversion systems 1a to 1j in FIGS. 1 to 10. As illustrated in the drawing, the power conversion system 1 includes the alternating-current power source 100, the inverter unit 23, the noise canceller 500, the path impedances 501 to 503, and a pseudo power source circuitry network (LISN) 600.

According to the international standard CISPR, an EMI measurement test specifies that the pseudo power source circuitry network (LISN) 600 is connected between a load system 700 and the alternating-current power source 100.

By connecting the pseudo power source circuitry network 600, a prescribed high-frequency impedance may be given between the load system 700 and the reference ground, and the load system 700 may be separated from a high-frequency signal unnecessary for the measurement on the power source line. The impedance of the pseudo power source circuitry network 600 is defined by the international standard CISPR. Therefore, in FIG. 13, the pseudo power source circuitry network 600 is connected between the alternating-current power source 100 and the load system 700. The impedance of the pseudo power source circuitry network 600 is included in the impedance Z2 of the path impedance 502. Furthermore, Z2' in FIG. 13 included in the impedance Z2 is located outside the load system 700, but may be located inside the load system 700, or may be located both outside and inside the load system 700. For example, Z2' outside the load system 700 is a wiring impedance or the like, and Z2' inside the load system 700 is an impedance by a circuitry such as a noise filter or a wiring impedance or the like.

In such a state, when the load system in which the noise reduction circuitries 30a to 30j including the noise canceller 500 of FIG. 13 are mounted is operated under a predetermined load condition, the current on the alternating-current power source 100 side at the first connection point at which the noise canceller 500 is connected to the power line may be the common mode noise current Ig(t). Thus, the common mode noise current Ig(t) may be defined regardless of the position of the noise canceller 500. Furthermore, the load system may be an integrated load device.

Here, the load system is particularly an air conditioner including an indoor unit and an outdoor unit. In this case, the operating conditions at the time of the EMI measurement test are determined such that the suction temperature of the indoor unit is in the range of (30±5° C.) and the set temperature is the settable lowest value during the cooling operation, but the other operating conditions are not defined. Therefore, the operating condition may be an operating condition for operating under a predetermined load condition, and the noise current at this time may be defined as the common mode noise current.

In this case, the common mode noise due to the common mode current flowing to the alternating-current power source 100 measured under a predetermined load condition needs to fall within a predetermined noise level (for example, a standard such as CISPR or Electrical Appliance and Material Safety Act described above), and therefore Ig(t) and Io(t) measured under this load condition of the air conditioner may be said to be currents for setting the predetermined noise level or less, and the voltage Vcc required for obtaining Ig(t) and Io(t) needs to satisfy any of Inequation (2), Inequation (4), and Inequation (5).

As the predetermined load condition in this case, a load condition defined by a standard applied to the air conditioner may be used. For example, a load condition defined in the international standard CISPR may be used.

When the load condition defined by the standard is changed due to the change of the standard, the load condition according to the standard may be used.

This load condition is specifically as follows described in the international standard CISPR 14-1.

A.1.20.1 A device in which the air temperature is controlled by changing the operating time of a compressor motor used in the device or a device including a heating device controlled by a thermostat needs to be measured in accordance with the same operating condition as in A.4.14.

A.1.20.2 In a device whose capacity may be varied by changing the number of rotations of a fan or a compressor motor by an inverter circuitry, the measurement needs to be performed by setting a temperature control device to the lowest temperature during a cooling operation and to the highest temperature during a heating operation.

The ambient temperature of the device during the tests of A.1.20.3, A.1.20.1, and A.1.20.2 is (15±5° C.) during a heating operation and (30±5)° C. during a cooling operation. When it is difficult to maintain the ambient temperature in this range, another temperature may be used as long as the device may be stably operated. The ambient temperature needs to be defined by the suction temperature of the indoor unit.

[Relationship Between Impedances of Compensation Current Paths]

Figure 14:
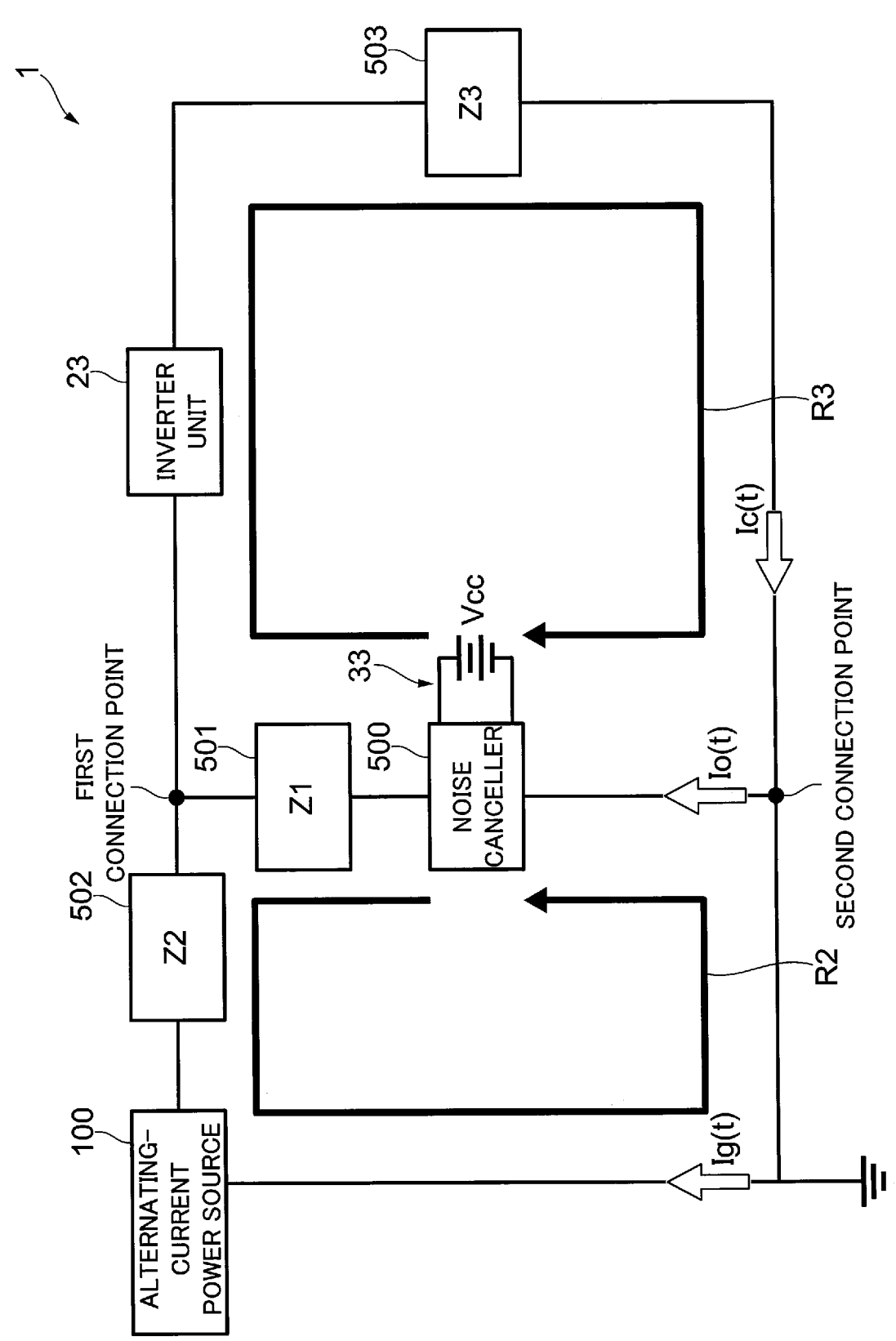
FIG. 14 is a diagram illustrating a compensation current path in a circuitry configuration of the power conversion system according to the present embodiment.

FIG. 14 is also a diagram schematically illustrating a circuitry configuration of the power conversion system 1 according to the present embodiment. FIG. 14 illustrates two compensation current paths in the circuitry configuration of the power conversion system 1 of FIG. 11. One is a compensation current path R2 on the alternating-current power source 100 (see FIGS. 1 to 10) side, and the other is a compensation current path R3 on the power converter 20 (see FIGS. 1 to 10) side.

According to the present embodiment, the impedance Z2 of the compensation current path R2 and the impedance Z3 of the compensation current path R3 are set to satisfy the conditional expression "Z2<Z3" so that the compensation current path is the compensation current path R2 on the alternating-current power source 100 side.

Specifically, when the power conversion system 1 corresponds to the power conversion systems 1*a* to 1*j* of FIGS. 1 to 10, such a setting is possible.

However, the direction of the compensation current Io(t) in FIG. 14 is the direction in the case of compensation by the compensation current path R2, and the direction of the compensation current Io(t) in FIG. 14 is reversed in the case of compensation by the compensation current path R3.

Next, the case where the power conversion system 1 particularly corresponds to the power conversion system 1*f* of FIG. 6 will be considered. Furthermore, it can also be said that the power conversion device included in the power conversion system 1 corresponds to the power conversion device 300*f* in FIG. 6.

Figure 15:
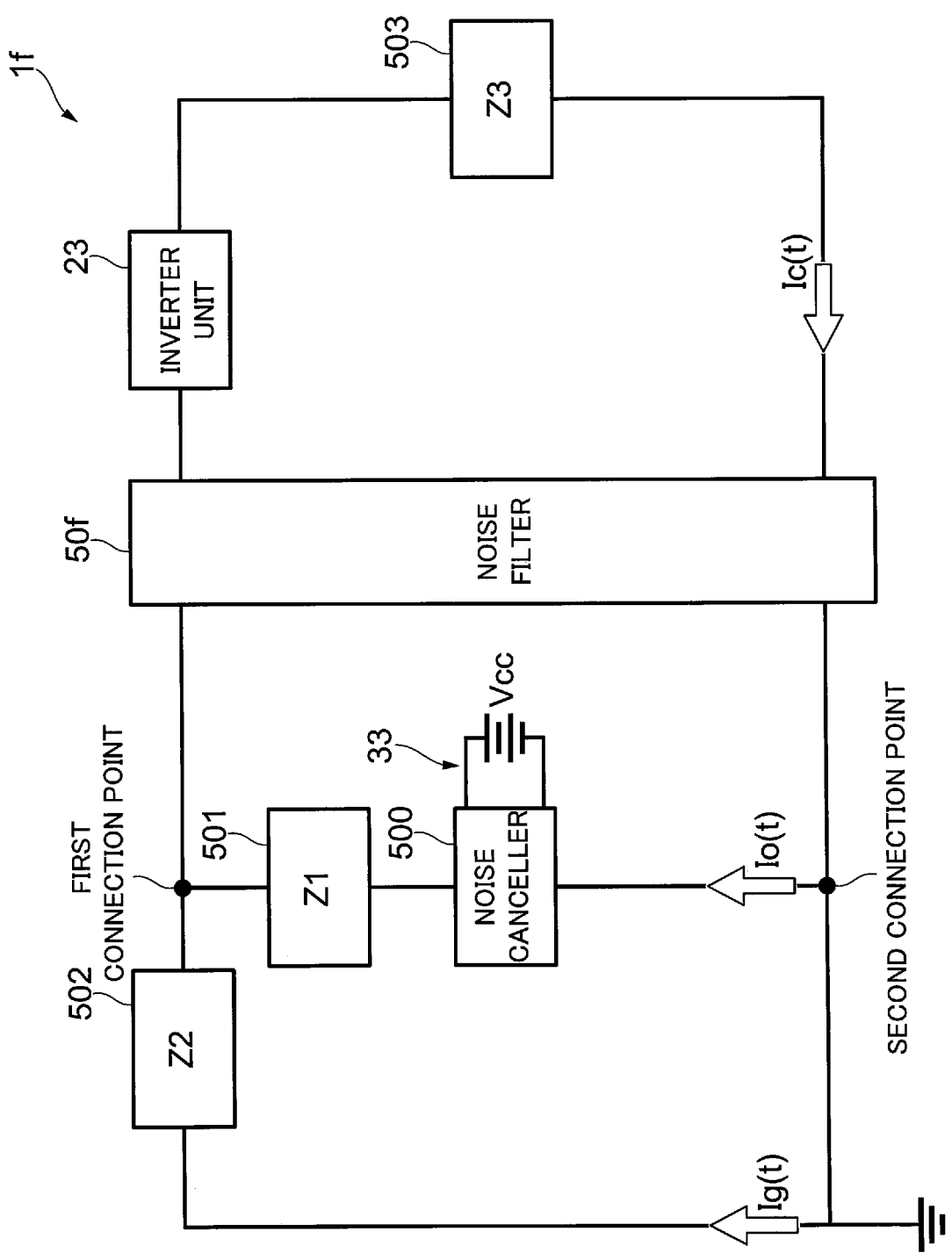
FIG. 15 is a diagram schematically illustrating a circuitry configuration of the power conversion system of FIG. 6.

FIG. 15 is a diagram schematically illustrating a circuitry configuration of the power conversion system 1*f* in this case. In FIG. 15, the noise filter 50*f* is added to the circuitry configuration of the power conversion system 1 of FIG. 11. Although not illustrated in FIG. 15, the noise filter 50*f* includes the common mode choke coils L2*r*, L2*s*, L2*t* and the Y capacitor Cy as illustrated in FIG. 6.

In this case, the impedance of the noise detection unit 31 with respect to the common mode noise current may be lower than the impedance of the common mode choke coils L2*r*, L2*s*, L2*t* of the noise filter 50*f* with respect to the common mode noise current.

Furthermore, the impedance of the noise detection unit 31 with respect to the common mode noise current may be ⅒ or less of the impedance of the common mode choke coils L2*r*, L2*s*, L2*t* of the noise filter 50*f* with respect to the common mode noise current.

Alternatively, the impedance of the noise detection unit 31 with respect to the common mode noise current may be 1/100 or less of the impedance of the common mode choke coils L2*r*, L2*s*, L2*t* of the noise filter 50*f* with respect to the common mode noise current.

Further, the setting of a specific value for the voltage Vcc of the direct-current power source unit 33 is the same as that described with reference to FIG. 11.

Furthermore, when the power conversion system 1 is the power conversion systems 1*a* to 1*j* of FIGS. 1 to 10, the compensation current path is R2, but the compensation current path may be R3. For example, as a modification of the fourth embodiment, when the noise detection unit 31*d* is provided on the power line between the capacitor unit 40*d* and the coupling capacitor unit 32*d* and the polarity of the coil L1*a* of the noise detection unit 31*d* is reversed, the capacitor unit 40*d* side, in other words, R3, serves as the compensation current path. In that case, a noise filter or the like may be provided in Z2 to adjust the impedances of R2 and R3. When the compensation current path is R3, it is preferable that the impedance Z2 of the compensation current path R2 and the impedance Z3 of the compensation current path R3 satisfy the conditional expression "Z2>Z3".

For example, in a case where the compensation current path is R3 as in the modification of the fourth embodiment, when the direction of the current in FIG. 14 is the positive direction of Io(t), Ic(t), Ig(t), the equation corresponding to Equation (1) is as follows.

$$V(t) = 2*(Z1*Io(t) + Z3*Ic'(t)) \qquad (7)$$

Therefore, the voltage Vcc may be set so as to satisfy any one of Inequation (2), Inequation (4), and Inequation (5) using Equation (7).

Furthermore, Ic'(t) is a common mode current after compensation obtained by subtracting Io(t) branched and flowing to the compensation current path R3 from Ic(t) in the compensation current path R3.

The reason why the sign of Z3*Ic'(t) is plus as compared with Equation (1) is that Ic(t) flowing through the compensation current path R3 may be reduced by flowing in the direction opposite to the direction of Io(t) in FIG. 14. Furthermore, according to the modification of the fourth embodiment, the path impedance 503 (Z3) corresponds to the combined impedance of the impedance due to the stray capacitance of the motor 200, the impedance of the rectifying unit 21, the inverter unit 23, the cable, or the like, between the inverter unit 23 and the load, and the impedance of the capacitor unit 40*d*.

[Refrigeration Apparatus]

Figure 16:
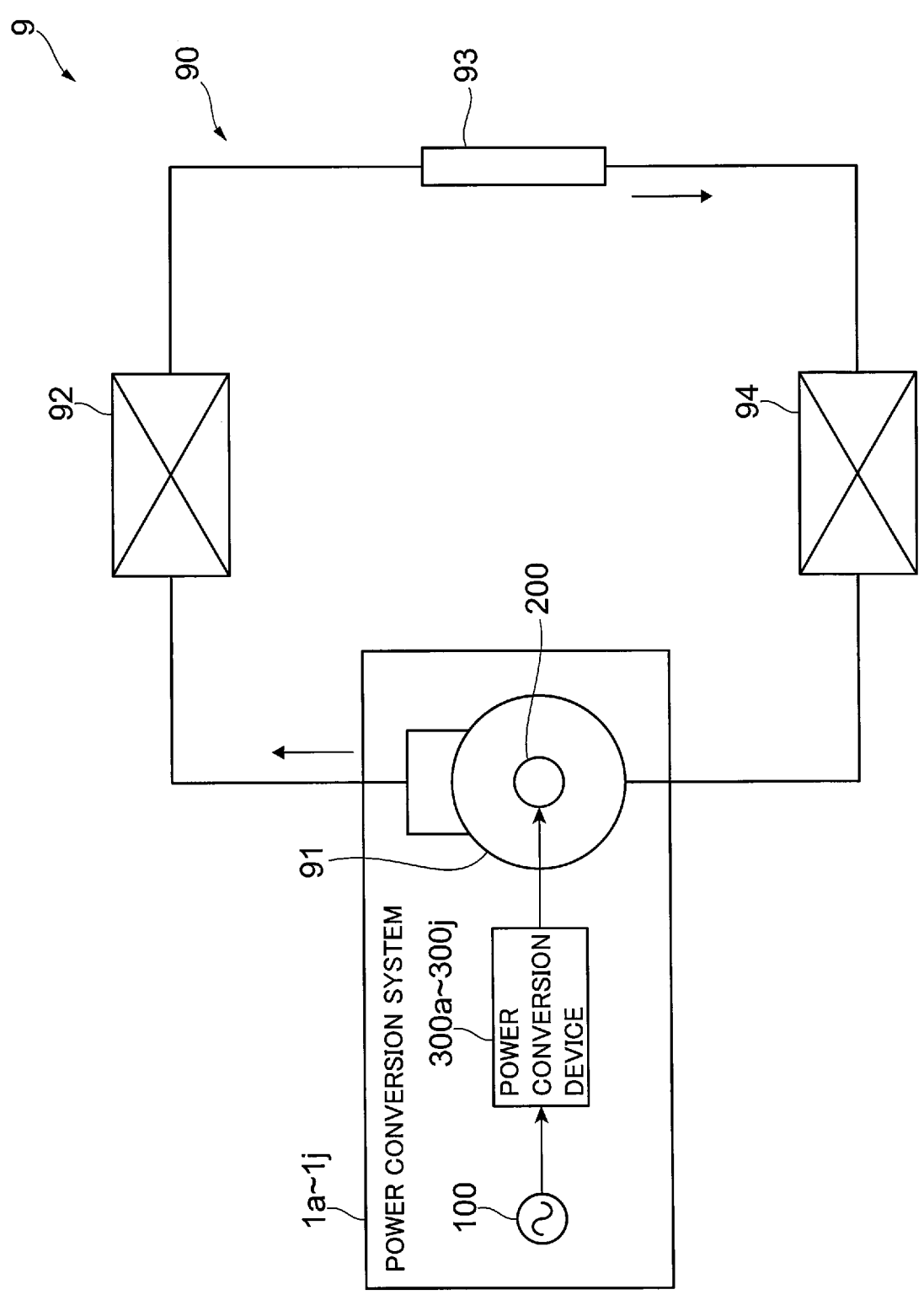
FIG. 16 is a diagram illustrating an example of a piping system of a refrigeration apparatus according to the present embodiment.

FIG. 16 is a diagram illustrating an example of a piping system of a refrigeration apparatus 9 according to the present embodiment. The refrigeration apparatus 9 performs a refrigeration cycle by circulating a refrigerant in a refrigerant circuitry 90. In the refrigerant circuitry 90, as illustrated in the drawing, a compressor 91, a condenser 92, an expansion mechanism 93, and an evaporator 94 are sequentially connected by pipes.

The compressor 91 compresses a low-pressure gas refrigerant by using the power of the motor 200 and discharges a high-pressure gas refrigerant. The motor 200 is included in the power conversion systems 1*a* to 1*j* of FIGS. 1 to 10, and the power conversion devices 300*a* to 300*j* drive the motor 200 by using the alternating-current power source 100 as a power source.

The condenser 92 condenses the high-pressure gas refrigerant discharged from the compressor 91 and discharges a high-pressure liquid refrigerant. The expansion mechanism 93 expands the high-pressure liquid refrigerant discharged from the condenser 92 and discharges a low-pressure refrigerant in a gas-liquid mixed state. The evaporator 94 evaporates the expanded low-pressure refrigerant liquid refrigerant in a gas-liquid mixed state discharged from the expansion mechanism 93 and discharges a low-pressure gas refrigerant.

Operation and Effect of Embodiment

The noise reduction circuitries 30*a* to 30*j* according to the present embodiment include the noise canceller 500 that injects the compensation current into the power line or the earth to reduce the common mode noise current flowing to the alternating-current power source 100 from the power converter 20 including the switching element connected to the alternating-current power source 100 through the power line and the earth, and the direct-current power source unit 33 that supplies power to the noise canceller 500. The voltage Vcc of the direct-current power source unit 33 is less than ⅔ of the peak value of the DC link voltage of the power converter 20, and when the connection point between the power line and the path connecting the power line and the earth via the noise canceller 500 is the first connection point, and the connection point between the path and the earth is the second connection point, when the compensated common mode noise current whose positive direction is a direction of flow from the alternating-current power source 100 side to the first connection point and flowing through the power line on a side closer to the alternating-current power source 100 than the first connection point is Ig(t), when the compensation current whose positive direction is a direction of flow from the second connection point to the first connection point and flowing through the path is Io(t), when the impedance of the path is Z1, when the impedance on a side closer to the alternating-current power source 100 than the first connection point and the second connection point is Z2, and when V(t)=2*(Z1*Io(t)−Z2*Ig(t)), the voltage Vcc is set to be the maximum value of the quasi-peak value of V(t) or √2 times or more the effective value of V(t).

With the noise reduction circuitries 30a to 30j, it is possible to suppress the disadvantage that the compensation current does not sufficiently flow when the voltage of the power source of the noise canceller 500 is lower than the DC link voltage of the power converter 20. Furthermore, as the voltage is the maximum value of the quasi-peak value or √2 times the effective value of V(t), it is possible to suppress an increase in the necessary voltage due to a waveform having a maximum value that is extremely large in a rare case.

According to the present embodiment, the voltage Vcc may be set to be equal to or more than a maximum value of an absolute value of V(t).

Thus, it is possible to more reliably suppress the disadvantage that the compensation current does not sufficiently flow when the voltage of the power source of the noise canceller 500 is lower than the DC link voltage of the power converter 20. For example, it is possible to suppress the disadvantage that the compensation current does not sufficiently flow even when Ic(t) having a maximum value, which is large, is generated.

The noise reduction circuitries 30a to 30j according to the present embodiment may include the noise detection units 31a to 31j that detect common mode noise generated in the power line on a side closer to the alternating-current power source 100 than the first connection point, and the noise detection units 31a to 31j may use a variation in a voltage with respect to the earth to detect a common mode noise voltage.

Thus, it is possible to suppress an increase in the impedance due to the noise detection units 31a to 31j.

The noise reduction circuitries 30a to 30j according to the present embodiment may include the noise detection units 31a to 31j that detect common mode noise generated in the power line on a side closer to the alternating-current power source 100 than the first connection point, and the noise detection units 31a to 31j may detect the common mode noise current flowing through the power line.

Thus, the common mode noise may be compensated for by amplifying the detected common mode noise current as it is.

According to the present embodiment, the voltage Vcc may be 250 V or less.

Thus, it is possible to reduce the voltage resistance of the components constituting the noise canceller 500.

According to the present embodiment, the voltage Vcc may be 100 V or less.

Thus, it is possible to use a high-speed transistor with a low voltage resistance in the noise canceller 500.

According to the present embodiment, the voltage Vcc may be 30 V or less.

Thus, a high-speed operational amplifier may be used in the noise canceller 500.

According to the present embodiment, the power converter 20 may include the rectifying unit 21 that rectifies the alternating-current voltage from the alternating-current power source 100 to generate the DC link voltage, at one of the first connection point and the second connection point of the path, one of the power line on a side closer to the alternating-current power source 100 than the rectifying unit 21 and the earth may be connected to the direct-current power source unit 33 via the coupling capacitor units 32a to 32g, and at the other of the first connection point and the second connection point of the path, the other of the power line and the earth may be connected to an output unit that outputs a compensation current of the noise canceller 500 via the output capacitor units 36a to 36g.

Thus, it is possible to reduce the impedance in a high-frequency range.

According to the present embodiment, V(t) may obtain Ig(t)=0.

Thus, it is possible to easily calculate the necessary power source voltage.

The load system according to the present embodiment is the load system including the noise reduction circuitries 30a to 30j according to any of the above, and the compensated common mode noise current Ig(t) is a noise current measured when the power converter 20 operates under a predetermined load condition of the load system in a state where the pseudo power source circuitry network 600 that measures common mode noise of the load system is connected between the alternating-current power source 100 and the load system, and Z2 is an impedance including the pseudo power source circuitry network 600.

With this load system, when there is a standard of a noise level to be maintained at the time of measurement using the pseudo power source circuitry network 600, it is possible to determine a voltage range necessary for suppressing the noise level to be equal to or less than the standard.

According to the present embodiment, the load system may be an air conditioner including an indoor unit and an outdoor unit capable of performing at least one of a cooling operation and a heating operation, and the predetermined load condition may be that, in a case of the cooling operation, a suction temperature of the indoor unit is 25 to 35 degrees and a set temperature of the indoor unit is a settable lowest temperature, and in a case of the heating operation, a suction temperature of the indoor unit is 10 to 20 degrees and a set temperature of the indoor unit is a settable highest temperature.

Thus, it is possible to determine the voltage range necessary for suppressing the noise level to be equal to or less than the standard under the load condition defined by the standard in the air conditioner.

The noise reduction circuitry according to the present embodiment includes the noise canceller 500 that injects the compensation current into the power line or the earth to reduce the common mode noise current flowing to the alternating-current power source 100 from the power converter 20 including the switching element connected to the alternating-current power source 100 through the power line and the earth, and the direct-current power source unit 33 that supplies power to the noise canceller 500. Further, the voltage Vcc of the direct-current power source unit 33 is less than ⅔ of the peak value of the DC link voltage of the power converter 20, and when the connection point between the power line and the path connecting the power line and the earth via the noise canceller 500 is the first connection point, and the connection point between the path and the earth is the second connection point, when the compensated common mode noise current whose positive direction is a direction of flow from the first connection point to the power converter 20 side and flowing through the power line on a side closer to the power converter 20 than the first connection point is Ic'(t), when the compensation current whose positive direction is a direction of flow from the second connection point to the first connection point and flowing through the path is Io(t), when the impedance of the path is Z1, when the impedance on a side closer to the power converter 20 than the first connection point and the second connection point is Z3, and when V(t)=2*(Z1*Io(t)+Z3*Ic'(t)), the voltage Vcc is set to be the maximum value of the quasi-peak value of V(t) or √2 times or more the effective value of V(t).

With this noise reduction circuitry, it is possible to suppress the disadvantage that the compensation current does not sufficiently flow when the voltage of the power source of the noise canceller 500 is lower than the DC link voltage of the power converter 20.

The noise reduction circuitry according to the present embodiment may include a noise detection unit that detects common mode noise generated in the power line on a side closer to the power converter 20 than the first connection point, and the noise detection unit may detect the compensated common mode noise current Ic'(t) flowing through the power line.

Thus, the common mode noise may be compensated for by amplifying the detected common mode noise current as it is.

The power conversion device 300*f* according to the present embodiment includes the noise canceller 500 that injects the compensation current into the power line or the earth to reduce the common mode noise current flowing to the alternating-current power source 100 from the power converter 20 including the switching element connected to the alternating-current power source 100 through the power line and the earth, and the direct-current power source unit 33*f* that supplies power to the noise canceller 500. The direct-current power source unit 33*f* is connected to the power line via the coupling capacitor unit 32*f* on a side closer to the alternating-current power source 100 than the power converter 20, the voltage Vcc of the direct-current power source unit 33*f* is less than ⅔ of the peak value of the DC link voltage of the power converter 20, the noise filter 50*f* including the common mode choke coil or the Y capacitor is provided between the alternating-current power source 100 and the power converter 20, and the noise detection unit 31*f* and the coupling capacitor unit 32*f* are connected to the power line on a side closer to the alternating-current power source 100 than the noise filter 50*f*.

With the power conversion device 300*f*, it is possible to suppress the disadvantage that, when the voltage of the power source of the noise canceller 500 is lower than the DC link voltage of the power converter 20, the compensation current flows to the power converter 20 side and the compensation effect is reduced. As the stray capacitance serving as the path on the power converter 20 side has a small capacitance and a high impedance, the necessary voltage is high. On the other hand, when the current flows to the alternating-current power source 100 side, the path has a few high-impedance components, and the impedance of the path may be reduced, and thus, even when the voltage is reduced, a reduction in the compensation effect may be suppressed.

The power conversion device 300*f* according to the present embodiment may include the noise detection unit 31*f* that detects the common mode noise current flowing through the power line.

Thus, the common mode noise may be compensated for by amplifying the detected common mode noise current as it is.

According to the present embodiment, the impedance of the noise detection unit 31*f* with respect to the common mode noise current may be lower than the impedance of the common mode choke coil of the noise filter 50*f* with respect to the common mode noise current.

Thus, it is possible to reduce the impedance of the compensation current path. In particular, by using a core for a high-frequency band having low magnetic permeability, it is possible to detect even high-frequency noise without increasing the impedance of the compensation path.

According to the present embodiment, the impedance of the noise detection unit 31*f* with respect to the common mode noise current may be ⅒ or less of the impedance of the common mode choke coil of the noise filter 50*f* with respect to the common mode noise current.

Thus, the impedance of the compensation current path may be further reduced.

According to the present embodiment, the impedance of the noise detection unit 31*f* with respect to the common mode noise current may be ⅟₁₀₀ or less of the impedance of the common mode choke coil of the noise filter 50*f* with respect to the common mode noise current.

Thus, the impedance of the compensation current path may be further reduced.

According to the present embodiment, the voltage of the direct-current power source unit 33 may be 250 V or less.

Thus, it is possible to reduce the voltage resistance of the components constituting the noise canceller 500.

According to the present embodiment, the voltage of the direct-current power source unit 33 may be 100 V or less.

Thus, it is possible to use a high-speed transistor with a low voltage resistance in the noise canceller 500.

According to the present embodiment, the voltage of the direct-current power source unit 33 may be 30 V or less.

Thus, a high-speed operational amplifier may be used in the noise canceller 500.

The refrigeration apparatus 9 according to the present embodiment includes the noise reduction circuitries 30*a* to 30*j* according to any of the above or the power conversion devices 300*a* to 300*j* according to any of the above.

According to the refrigeration apparatus 9, it is possible to suppress the disadvantage that occurs with regard to the flow of the compensation current when the voltage of the power source of the noise canceller 500 is lower than the DC link voltage of the power converter 20.

While the embodiments have been described above, it will be understood that various changes in form and detail may be made therein without departing from the spirit and scope of the claims.

REFERENCE SIGNS LIST

1*a* to 1*j* Power conversion system, 10 Power source terminal block, 20 Power converter, 21 Rectifying unit, 23 Inverter unit, 30*a* to 30*j* Noise reduction circuitry, 31*a* to 31*j* Noise detection unit, 32*a* to 32*j* Coupling capacitor unit, 33*a* to 33*j* Direct-current power source unit, 34*a* to 34*j* Detection circuitry, 35*a* to 35*j* Amplifier, 36a to 36j Output capacitor unit, 40d, 40e Capacitor unit, 50f, 50g Noise filter, 91 Compressor, 100 Alternating-current power source, 200 Motor, 300a to 300j Power conversion device, 501, 502, 503 Path impedance, 600 Pseudo power source circuitry network, 700 Load system

The invention claimed is:

1. Noise reduction circuitry comprising:

noise canceller circuitry that injects a compensation current into a power line or an earth to reduce a common mode noise current flowing to an alternating-current power source from a power converter including a switching element connected to the alternating-current power source through the power line and the earth; and a direct-current power source that supplies power to the noise canceller circuitry, wherein a voltage Vcc of the direct-current power source is less than ⅔ of a peak value of a DC link voltage of the power converter, and when a connection point between the power line and a path connecting the power line and the earth via the noise canceller circuitry is a first connection point, and a connection point between the path and the earth is a second connection point, when the compensated common mode noise current whose positive direction is a direction of flow from the alternating-current power source side to the first connection point and flowing through the power line on a side closer to the alternating-current power source than the first connection point is Ig(t), when the compensation current whose positive direction is a direction of flow from the second connection point to the first connection point and flowing through the path is Io(t), when an impedance of the path is Z1, when an impedance on a side closer to the alternating-current power source than the first connection point and the second connection point is Z2, and when $V(t)=2*(Z1*Io(t)-Z2*Ig(t))$, the voltage Vcc is set to be a maximum value of a quasi-peak value of the V(t) or √2 times or more an effective value of the V(t).

2. The noise reduction circuitry according to claim 1, wherein the voltage Vcc is set to be equal to or more than a maximum value of an absolute value of the V(t).

3. The noise reduction circuitry according to claim 1, comprising a noise detector that detects common mode noise generated in the power line on a side closer to the alternating-current power source than the first connection point, wherein the noise detector uses a variation in a voltage with respect to the earth to detect a common mode noise voltage.

4. The noise reduction circuitry according to claim 1, comprising a noise detector that detects common mode noise generated in the power line on a side closer to the alternating-current power source than the first connection point, wherein the noise detector detects the compensated common mode noise current Ig(t) flowing through the power line.

5. The noise reduction circuitry according to claim 1, wherein the power converter includes a rectifier that rectifies an alternating-current voltage from the alternating-current power source to generate the DC link voltage, at one of the first connection point and the second connection point of the path, one of the power line on a side closer to the alternating-current power source than the rectifier and the earth is connected to the direct-current power source via a coupling capacitor, and at the other of the first connection point and the second connection point of the path, the other of the power line and the earth is connected to an output that outputs a compensation current of the noise canceller circuitry via an output capacitor.

6. The noise reduction circuitry according to claim 1, wherein the V(t) obtains the Ig(t)=0.

7. A load system comprising the noise reduction circuitry according to claim 1, wherein the compensated common mode noise current Ig(t) is a noise current measured when the power converter operates under a predetermined load condition of the load system in a state where a pseudo power source circuitry network that measures common mode noise of the load system is connected between the alternating-current power source and the load system, and the Z2 is an impedance including the pseudo power source circuitry network.

8. The load system according to claim 7, wherein the load system is an air conditioner including an indoor unit and an outdoor unit capable of performing at least one of a cooling operation and a heating operation, and the predetermined load condition is that in a case of the cooling operation, a suction temperature of the indoor unit is 25 to 35 degrees and a set temperature of the indoor unit is a settable lowest temperature, and in a case of the heating operation, a suction temperature of the indoor unit is 10 to 20 degrees and a set temperature of the indoor unit is a settable highest temperature.

9. Noise reduction circuitry comprising:

noise canceller circuitry that injects a compensation current into a power line or an earth to reduce a common mode noise current flowing to an alternating-current power source from a power converter including a switching element connected to the alternating-current power source through the power line and the earth; and a direct-current power source that supplies power to the noise canceller circuitry, wherein a voltage Vcc of the direct-current power source is less than ⅔ of a peak value of a DC link voltage of the power converter, and when a connection point between the power line and a path connecting the power line and the earth via the noise canceller circuitry is a first connection point, and a connection point between the path and the earth is a second connection point, when the compensated common mode noise current whose positive direction is a direction of flow from the first connection point to the power converter side and flowing through the power line on a side closer to the power converter than the first connection point is Ic'(t), when the compensation current whose positive direction is a direction of flow from the second connection point to the first connection point and flowing through the path is Io(t), when an impedance of the path is Z1, when an impedance on a side closer to the power converter than the first connection point and the second connection point is Z3, and when $V(t)=2*(Z1*Io(t)+Z3*Ic'(t))$, the voltage Vcc is set to be a maximum value of a quasi-peak value of the $V(t)$ or $\sqrt{2}$ times or more an effective value of the $V(t)$.

10. The noise reduction circuitry according to claim 9, comprising a noise detector that detects common mode noise generated in the power line on a side closer to the power converter than the first connection point, wherein the noise detector detects the compensated common mode noise current Ic'(t) flowing through the power line.

11. A power conversion device comprising:

noise canceller circuitry that injects a compensation current into a power line or an earth to reduce a common mode noise current flowing to an alternating-current power source from a power converter including a switching element connected to the alternating-current power source through the power line and the earth; and a direct-current power source that supplies power to the noise canceller circuitry, wherein the direct-current power source is connected to the power line via a coupling capacitor on a side closer to the alternating-current power source than the power converter, a voltage Vcc of the direct-current power source is less than ⅔ of a peak value of a DC link voltage of the power converter, a noise filter including a common mode choke coil or a Y capacitor is provided between the alternating-current power source and the power converter, and a noise detector and the coupling capacitor are connected to the power line on a side closer to the alternating-current power source than the noise filter.

12. The power conversion device according to claim 11, wherein the noise detector detects the common mode noise current flowing through the power line.

13. The power conversion device according to claim 12, wherein an impedance of the noise detector with respect to the common mode noise current is lower than an impedance of the common mode choke coil of the noise filter with respect to the common mode noise current.

* * * * *